United States Patent
Hirayama

(10) Patent No.: US 7,457,224 B2
(45) Date of Patent: Nov. 25, 2008

(54) OPTICAL ELEMENT HAVING AN ANTI-REFLECTION FILM AND OPTICAL PICKUP APPARATUS

(75) Inventor: Hiroshi Hirayama, Musashino (JP)

(73) Assignee: Konica Minolta Opto, Inc., Tokyo (JP)

( * ) Notice: Subject to any disclaimer, the term of this patent is extended or adjusted under 35 U.S.C. 154(b) by 529 days.

(21) Appl. No.: 10/875,895

(22) Filed: Jun. 25, 2004

(65) Prior Publication Data

US 2004/0264354 A1 Dec. 30, 2004

(30) Foreign Application Priority Data

Jun. 30, 2003 (JP) ............................. 2003-187609

(51) Int. Cl.
*G11B 7/00* (2006.01)
(52) U.S. Cl. .................... 369/112.23; 369/112.01
(58) Field of Classification Search ............ 369/112.23, 369/112.01
See application file for complete search history.

(56) References Cited

U.S. PATENT DOCUMENTS

| | | | |
|---|---|---|---|
| 5,579,159 A * | 11/1996 | Ito | 359/487 |
| 6,243,203 B1 * | 6/2001 | Schleipen et al. | 359/581 |
| 6,574,039 B1 * | 6/2003 | Murata et al. | 359/359 |
| 6,768,581 B1 * | 7/2004 | Yip et al. | 359/355 |
| 2003/0103271 A1 * | 6/2003 | Ohta | 359/719 |
| 2003/0123334 A1 * | 7/2003 | Fujimaki et al. | 369/13.23 |

FOREIGN PATENT DOCUMENTS

| | | |
|---|---|---|
| JP | 10-160906 | 6/1998 |
| JP | 2001-052366 | 2/2001 |

* cited by examiner

*Primary Examiner*—Wayne Young
*Assistant Examiner*—LaTanya Bibbins
(74) *Attorney, Agent, or Firm*—Finnegan, Henderson, Farabow, Garrett & Dunner, L.L.P.

(57) ABSTRACT

An optical element to be arranged in an optical pickup apparatus for conducting information recording and/or reproducing and to converge laser light beams having a plurality of wavelengths including a wavelength of $\lambda 1$ onto information recording media, includes one or more of optical element main bodies; and an antireflective film which is arranged on at least one surface on the optical element main bodies and on which an optical functional surface is formed, wherein, when the optical functional surface and a first laser beam having the wavelength $\lambda 1$ makes an angle $\theta_1$ in the range of $0° \leq \theta_1 \leq 60°$, the optical element satisfies $|R_{p1} - R_{s1}| \leq 2\%$ where $R_{p1}$ and $R_{s1}$ are respectively P polarized light and S polarized light reflectivities of the first laser light on the optical functional surface.

19 Claims, 13 Drawing Sheets

1 (1A)

OPTICAL ELEMENT HAVING AN ANTI-REFLECTION FILM AND OPTICAL PICKUP APPARATUS

BACKGROUND OF THE INVENTION

The present invention relates to an optical pickup device that conducts recording and/or reproducing of information and to an optical element provided on the optical pickup device.

With a tendency toward high density of an optical pickup device, a wavelength of a laser beam is becoming shorter and a numerical aperture of an optical element such as an objective lens is growing greater, in recent years. For example, in the optical pickup device employing a laser beam having a wavelength of 405 nm, a numerical aperture of an objective lens is as great as 0.6 -0.9, and a maximum angle of incidence or emergence of a laser beam for this objective lens is 60-70°, in general.

Incidentally, it is necessary to keep a beam spot in an excellent form, to conduct accurate recording and reproducing for information. Then, to keep a beam spot in an excellent form, it is necessary to make the intensity of light transmitted through an outer peripheral portion where an angle of incidence is large and the reflectance is high to be the same as the intensity of light transmitted through a central portion where the reflectance is low, in the objective lens. With the background of this kind, there are a technology (see Patent Document 1, for example) to make a thickness of an antireflective film to be thicker on the outer circumferential portion than on the central portion, and a technology (see Patent Document 2, for example) to design an antireflective film by designing the wavelength that makes the reflectance to be lowest in the case of entering perpendicularly to be longer than the working wavelength.

(Patent Document 1)
TOKKAIHEI No. 10-160906

(Patent Document 2)
TOKKAI No. 2001-052366

However, when technologies disclosed in the Patent Documents 1 and 2, transmittance for P polarized light and that for S polarized light are dissociated from each other on the outer circumferential portion of the objective lens.

To explain a simple case, it is considered that an optical pickup device includes a glass objective lens which is used for a light flux with wavelength of 405 nm, has numerical aperture of 0.85 (where the maximum incident angle is 65°) and comprises an antireflective film made from a $MgF_2$ monolayer on both sides of the objective lens. The $MgF_2$ monolayer has a thickness of 73 nm and acts as an anti-reflection coating whose reflectance is around 1.4% for light fluxes with wavelength of $\lambda$=405 nm and incident angle of 0°.

Herein, the reflectances of P polarized light and S polarized light having wavelength of $\lambda$=405 nm and an incident angle of 60°, show 0.6% and 10.6% respectively, that is, a difference of them is about 10%.

As shown in FIG. 13, the optical pickup device which comprises semiconductor laser element 501, polarization beam splitter 502, ¼ wavelength plate 503, objective lens 504, disc 505, collimating lens 506 and 507 and photodetector 508, is considered in this case. A laser beam emitted by the semiconductor laser element 501 passes though the collimating lens 506 and the polarization beam splitter 502 and becomes a linearly polarized light. Furthermore, after the linearly polarized light passes through the ¼ wavelength plate 503, it becomes a circularly polarized light and enters into the objective lens 504. When a light beam with an incident angle of around 60°enters into surface S1 on the objective lens 504, the incident light becomes an elliptically polarized light, because the transmittance of S polarized light is 90%, whereas the transmittance of P polarized light is almost 100% on the surface S1. Then, the elliptically polarized light is emitted from surface S2 on the objective lens 504, having also an incident angle of around 60°. In this case, similarly, the transmittance of S polarized light is 90%, whereas the transmittance of P polarized light is almost 100% on the surface S2. Therefore, because of this transmittance difference between the P polarized light and the S polarized light, the light emitted from the surface S2 is moreover varied from an ideal circularly polarized light. Thereafter, the incident light onto the disc 505 has an opposite polarization rotation because its phase is reversed, in other words, shifted for by $\pi$ and passes through the surface S2 and the surface S1 in this order. A light that passed through outer circumferential portion of the objective lens 504 becomes the heavily deformed elliptically polarized light after the light beam totally passes four surfaces at last. While, the light that passed around the light axis of the objective lens 504 remains a circularly polarized light with a reversed rotation after it passes through the four surfaces because transmittances of P polarized light and S polarized light are approximately equal nearby this area. So, when the light passed outer circumferential portion and around the optical axis of the objective lens pass through the ¼ wavelength plate 503 and are converted into a linearly polarized light, a displacement is caused between a light vibration plan of each light. Ordinarily, the polarization beam splitter 502 is designed to separate P polarized light and S polarized light which passed around the optical axis of the objective lens. It reduces a quantity of light entering into a photodetector because the displacement in the vibration planes of the light passed through the outer circumferential portion makes loss when the light is separated. Moreover the low transmittance of the S polarized light similarly decreases amount of light to the photodetector. Furthermore, there is a problem that deterioration of amount of light described above makes a precision of information recording and/or reproducing worse.

Further, in an optical pickup device without a ¼ wavelength plate which makes a linearly polarized light enter into an objective lens, transmittance of a light positioned along a radial direction perpendicular to a vibration plane of the linearly polarized light decreases when an incident angle is almost 60°as shown in FIGS. 14(a) and 14(b). Herein, FIG. 14(a) shows a polarized light state before it passes through the objective lens and FIG. 14(b) shows a polarized light state after it passes through the objective lens. When a transmittance along a radial direction parallel to the vibration plane of the linearly polarized light is assumed 1, reduction rate of a transmitted light positioned along a radial direction perpendicular to the vibration plane of the linearly polarized light is 0.65, which is the fourth-power of 0.9. In other words, it arises a difference of 35% in a transmittance according to positions on the objective lens. There are problems that the transmittance difference along the radial direction reduces the amount of incident light to the photodetector and makes a distortion of a focus servo signal, a tracking servo signal and so on, and at last the precision on information recording and/or reproducing turns worse. As shown in the above descriptions, conventional reflection prevention coat is insufficient for lenses having high NA such as an optical pickup lenses for a wavelength $\lambda$=405 nm and such lenses require coating films having same transmission characteristics in P polarized light and S polarized light and higher reflection prevention performance.

In a photomagnetic recording apparatus, rotation of a plane of polarization for light needs to be detected, and therefore, it is preferable that transmittance for P polarized light is the same as that for S polarized light in the objective lens.

SUMMARY OF THE INVENTION

An object of the invention is to provide an optical element that can conduct accurate recording and/or reproducing for information.

The structure described in Item 1 is an optical element that is provided on an optical pickup device conducting recording and/or reproducing of information and converges laser beams having respectively a plurality of wavelengths including wavelength $\lambda 1$ (390 nm$\leq\lambda 1\leq$430 nm), wherein one or more optical element main bodies and an antireflective film which is provided on at least one side of the optical element main body and forms an optical functional surface are provided, and reflectance $Rp_1$ on the optical functional surface for P polarized light of the first laser beam and reflectance $R_{s1}$ for S polarized light satisfy $|R_{p1}-R_{s1}|\leq 2\%$, when angle $\theta_1$ formed by the optical functional surface and the first laser beam having the wavelength $\lambda 1$ satisfies $0°\leq\theta_1\leq 60°$.

In this case, a plurality of wavelengths means wavelengths of two or more types.

In the aforesaid structure, in case that reflectance $Rp_1$ on the optical functional surface for P polarized light of the first laser beam and reflectance $R_{s1}$ for S polarized light satisfy $|R_{p1}-R_{s1}|\leq 2\%$ and angle $\theta_1$ formed by the optical functional surface and the first laser beam satisfies $0°\leq\theta_1\leq 60°$, high accuracy of information recording and/or reproducing is conducted. Furthermore, transmittance for P polarized light and that for S polarized light gives are both high to be on the same level even on the outer circumferential portion of the optical element. Therefore, in the optical pickup device wherein a ¼ wavelength plate is arranged to be closer to a laser light source on the optical element, conversion from a linearly polarized light into a circularly polarized light and conversion from a circularly polarized light into a linearly polarized light are conducted almost surely in a total area within an effective diameter. Further, it is possible to keep a beam spot in an excellent form even in the optical pickup device wherein no ¼ wavelength plate is arranged and a linearly polarized light enters the objective lens.

Since the foregoing prevents that an amount of light entering the photodetector is reduced and distortions are generated on signals by dissociation between transmittance for P polarized light and that for S polarized light on an outer peripheral portion of the optical element, which is different from the past, it is possible to conduct accurate recording and/or reproducing of information by using the first laser beam.

Incidentally, in the optical element, it is preferable to design an antireflective film so that a phase of transmitted P polarized light and that of transmitted S polarized light may be the same. In this case, in the ¼ wavelength plate, conversion from a linearly polarized light into a circularly polarized light and conversion from a circularly polarized light into a linearly polarized light can be conducted more surely.

DETAILED DESCRIPTION OF THE PREFERRED EMBODIMENT

Figure 1:
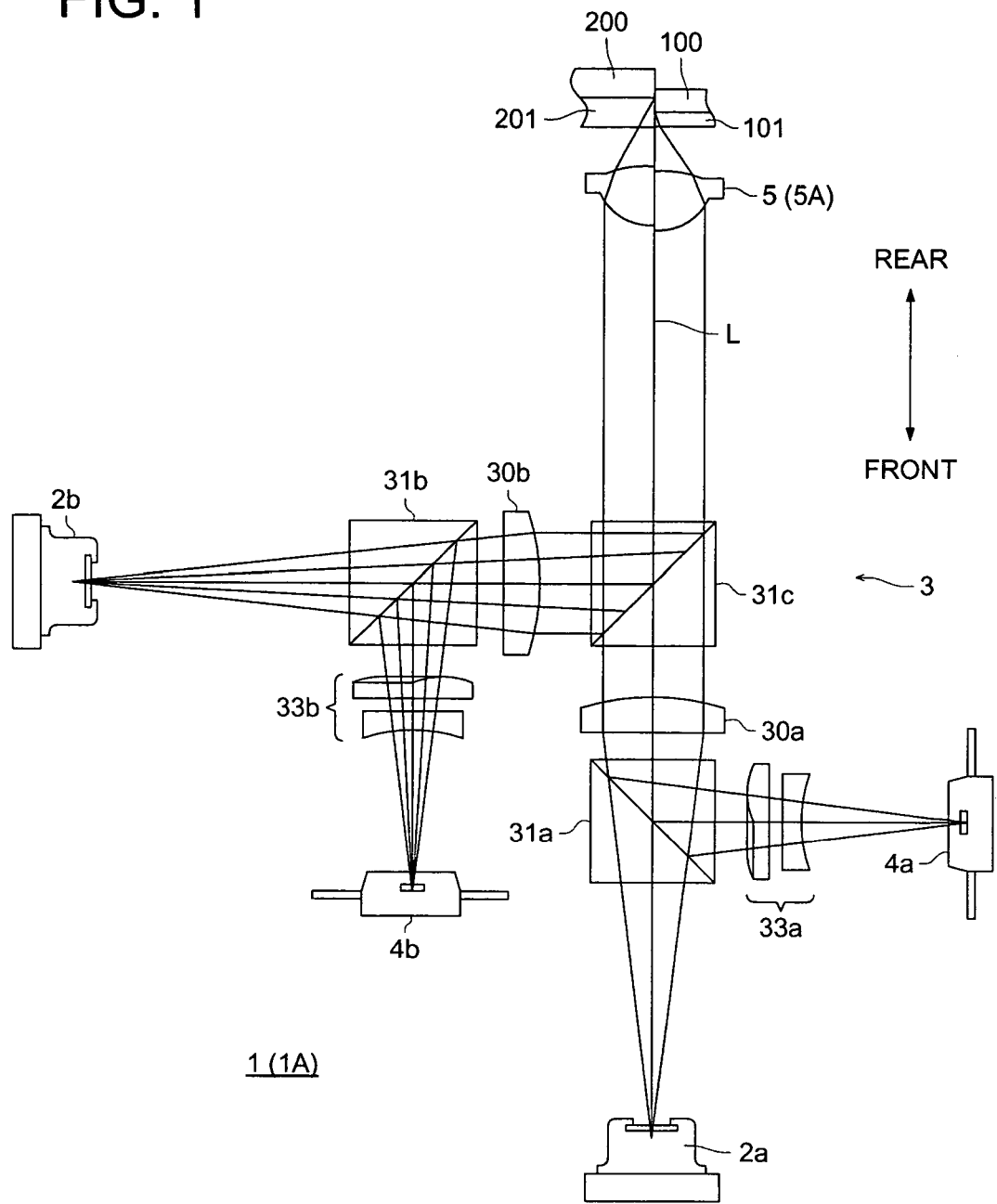
FIG. 1 is a diagram showing a schematic structure of an optical pickup device relating to an embodiment of the invention.

Preferred embodiments of the invention will be explained as follows.

The structure described in Item 2 is the optical element described in Item 1, wherein the reflectance $R_{p1}$ on the optical functional surface for P polarized light of the first laser beam and the reflectance $R_{s1}$ for S polarized light satisfy $(R_{p1}+R_{s1})/2\leq 5\%$, when angle $\theta_1$ formed by the optical functional surface and the first laser beam having the wavelength $\lambda 1$ satisfies $0°\leq\theta_1\leq 60°$.

In the structure described in Item 2, when reflectance $R_{p1}$ on the optical functional surface for P polarized light of the first laser beam and reflectance $R_{s1}$ for S polarized light satisfy $(R_{p1}+R_{s1})/2 \leq 5\%$, and angle $\theta_1$ formed by the optical functional surface and the first laser beam having the wavelength $\lambda 1$ satisfies $0° \leq \theta_1 \leq 60°$, decline of an amount of transmitted light on the optical element is reduced to a minimum. Therefore, it is possible to conduct more accurate recording and/or reproducing of information by using the first laser beam.

The structure described in Item 3 is the optical element described in Item 1, wherein the plural wavelengths include wavelength $\lambda 2$ (630 nm $\leq \lambda 2 \leq$ 670 nm), and reflectance $Rp_2$ on the optical functional surface for P polarized light of the second laser beam and reflectance $R_{s2}$ for S polarized light satisfy $|R_{p2}-R_{s2}| \leq 4\%$, when angle $\theta_2$ formed by the optical functional surface and the second laser beam having the wavelength $\lambda 2$ satisfies $0° \leq \theta_2 \leq 50°$.

The structure described in Item 4 is the optical element described in Item 3, wherein reflectance $R_2$ on the optical functional surface for P polarized light of the second laser beam and reflectance $R_{s2}$ for S polarized light satisfy $(R_{p2}+R_{s2})/2 \leq 5\%$, when angle $\theta_2$ formed by the optical functional surface and the second laser beam having the wavelength $\lambda 2$ satisfies $0° \leq \theta 2 \leq 50°$.

In the structure described in Item 3, when reflectance $R_{p2}$ on the optical functional surface for P polarized light of the second laser beam and reflectance $R_{s2}$ for S polarized light satisfy $|R_{p2}-R_{s2}| \leq 4\%$, and angle $\theta_2$ formed by the optical functional surface and the second laser beam satisfies $0° \leq \theta_2 \leq 50°$, it conducts high accuracy of information recording and/or reproducing. Furthermore, transmittance for P polarized light and that for S polarized light are both high to be on the same level even on the outer circumferential portion of the optical element. Therefore, an amount of light entering the photodetector is not reduced and distortions are not generated on signals, which is different from the past, and it is possible to conduct accurate recording and/or reproducing of information by using the second laser beam.

Moreover, the structure described in Item 4, when reflectance $R_2$ on the optical functional surface for P polarized light of the second laser beam and reflectance $R_{s2}$ for S polarized light satisfy $(R_{p2}+R_2)/2 \leq 5\%$, and angle $\theta_2$ formed by the optical functional surface and the second laser beam having the wavelength $\lambda 2$ satisfies $0° \leq \theta_2 \leq 50°$, decline of an amount of transmitted light on the optical element is reduced to a minimum. Therefore, an amount of light entering the photodetector is not reduced and it is possible to conduct more accurate recording and/or reproducing of information by using the second laser beam.

The structure described in Item 5 is the optical element described in Item 1-Item 4, wherein the plural wavelengths mentioned above include wavelength $\lambda 3$ (760 nm $\leq \lambda 3 \leq$ 800 nm), and when angle $\theta_3$ formed by the optical functional surface and third laser beam having the wavelength $\lambda 3$ satisfies $0° \leq \theta_3 \leq 50°$, reflectance $R_{p3}$ on the optical functional surface for P polarized light of the third laser beam and reflectance $R_{s3}$ for S polarized light satisfy $|R_{p3}-R_{s3}|=4\%$.

The structure described in Item 6 is the optical element described in Item 5, wherein reflectance $R_{p3}$ on the optical functional surface for P polarized light of the third laser beam and reflectance $R_{s3}$ for S polarized light satisfy $(R_{p3}+R_{s3})/2 \leq 5\%$, when angle $\theta_3$ formed by the optical functional surface and the third laser beam having the. wavelength $\lambda 3$ satisfies $0° \leq \theta_3 \leq 50°$.

In the structure described in Item 5, when reflectance $R_{p3}$ on the optical functional surface for P polarized light of the third laser beam and reflectance $R_{s3}$ for S polarized light satisfy $|R_{p3}-R_{s3}| \leq 4\%$, and angle $\theta_3$ formed by the optical functional surface and the third laser beam satisfies $0° \leq \theta_3 \leq 50°$, it gives high accuracy of information recording and/or reproducing. Furthermore, transmittance for P polarized light and that for S polarized light are both high to be on the same level even on the outer circumferential portion of the optical element. Therefore, an amount of light entering the photodetector is not reduced and it is possible to conduct accurate recording and/or reproducing of information by using the third laser beam.

Moreover, the structure described in Item 6, when reflectance $R_{p3}$ on the optical functional surface for P polarized light of the third laser beam and reflectance $R_{s3}$ for S polarized light satisfy $(R_{p3}+R_{s3})/2 \leq 5\%$, and angle $\theta_3$ formed by the optical functional surface and the third laser beam having the wavelength $\lambda 3$ satisfies $0° \leq \theta_3 \leq 50°$, decline of an amount of transmitted light on the optical element is reduced to a minimum. Therefore, an amount of light entering the photodetector is not reduced, which is different from the past, and it is possible to conduct more accurate recording and/or reproducing of information by using the third laser beam.

The structure described in Item 7 is the optical element described in either one of Item 1-Item 6, wherein the plural wavelengths mentioned above include wavelength $\lambda 2$ (630 nm $\leq \lambda 2 \leq$ 670 nm) and wavelength $\lambda 3$ (760 nm $\leq \lambda 3 \leq$ 800 nm), and when angle $\theta_2$ formed by the optical functional surface and second laser beam having the wavelength $\lambda 2$ satisfies $0° \leq \theta_2 \leq 50°$, reflectance $R_{p2}$ on the optical functional surface for P polarized light of the second laser beam and reflectance $R_{s2}$ for S polarized light satisfy $|R_2-R_{s2}| \leq 2\%$, and when angle $\theta_3$ formed by the optical functional surface and third laser beam having the wavelength $\lambda 3$ satisfies $0° \leq \theta_3 23\ 50°$, reflectance $R_{p3}$ on the optical functional surface for P polarized light of the third laser beam and reflectance $R_{s3}$ for S polarized light satisfy $|R_{p3}-R_{s3}| \leq 2\%$.

The structure described in Item 8 is the optical element described in Item 7, wherein when angle $\theta_2$ formed by the optical functional surface and second laser beam having the wavelength $\lambda 2$ satisfies $0° \leq \theta_2 \leq 50°$, reflectance $R_{p2}$ on the optical functional surface for P polarized light of the second laser beam and reflectance $R_{s2}$ for S polarized light satisfy $(R_{p2}+R_{s2})/2 \leq 5\%$, and when angle $\theta_3$ formed by the optical functional surface and third laser beam having the wavelength $\lambda 3$ satisfies $0° \leq \theta_3 \leq 50°$, reflectance $R_3$ on the optical functional surface for P polarized light of the third laser beam and reflectance $R_{s3}$ for S polarized light satisfy $(R_{p3}+R_{s3})/2 \leq 5\%$.

In the structure described in Item 7, when reflectance $Rp_2$ on the optical functional surface for P polarized light of the second laser beam and reflectance $R_{s2}$ for S polarized light satisfy $|R_{p2}-R_{s2}| \leq 2\%$, and angle $\theta_2$ formed by the optical functional surface and the second laser beam satisfies $0° \leq \theta_2 \leq 50°$, and therefore, it makes high accuracy of information recording and/or reproducing. Furthermore, transmittance for P polarized light and that for S polarized light are both high to be same level even on the outer circumferential portion of the optical element. Therefore, an amount of light entering the photodetector is not reduced and distortions are not generated on signals, which is different from the past, and it is possible to conduct accurate recording and/or reproducing of information by using the second laser beam.

Further, when angle $\theta_3$ formed by the optical functional surface and the third laser beam satisfies $0° \leq \theta_3 \leq 50°$, and reflectance $R_{p3}$ on the optical functional surface for P polarized light of the third laser beam and reflectance $R_{s3}$ for S polarized light satisfy $|R_{p3}-R_{s3}| \leq 2\%$, and therefore, it makes high accuracy of information recording and/or reproducing. Furthermore, transmittance for P polarized light and that for S polarized light are both on the outer circumferential portion of the optical element to be on the same level more. Accordingly, an amount of light entering the photodetector is not reduced and distortions are not generated on signals, which is different from the past, and it is possible to conduct accurate recording and/or reproducing of information by using the third laser beam.

Moreover, the structure described in Item 8, when angle $\theta_2$ formed by the optical functional surface and the second laser beam satisfies $0° \leq \theta_2 \leq 50°$, and reflectance $R_{p2}$ on the optical functional surface for P polarized light of the second laser beam and reflectance $R_{s2}$ for S polarized light beam satisfy $(R_{p2}+R_{s2})/2 \leq 5\%$, and when angle $\theta_3$ formed by the optical functional surface and the third laser beam satisfies $0° \leq \theta_3 \leq 50°$ and reflectance $R_{p3}$ on the optical functional surface for P polarized light of the third laser beam and reflectance $R_{s3}$ for S polarized light beam satisfy $(R_{p3}+R_{s3})/2 \leq 5\%$, decline of an amount of transmitted light on the optical element is reduced to a minimum. Therefore, an amount of light entering the photodetector is not reduced, which is different from the past, and it is possible to conduct more accurate recording and/or reproducing of information by using the second and third laser beams.

The structure described in Item 9 is the optical element described in either one of Item 1-Item 8, wherein the plural wavelengths mentioned above include wavelength $\lambda 2$ (630 nm $\leq \lambda 2 \leq$ 670 nm) and wavelength $\lambda 3$ (760 nm $\leq \lambda 3 \leq$ 800 nm).

The structure described in Item 9 makes it possible to conduct accurate recording and/or reproducing of information in the optical pickup device which can respond to all of a blue-ray disc or AOD (Advanced Optical Disc), DVD and CD.

The structure described in Item 10 is the optical element described in either one of Item 1-Item 9, wherein the antireflective film is provided on each of both surfaces of each optical element main body.

The structure described in Item 10 makes it possible to enhance transmittance for P polarized light and that for S polarized light surely on the outer circumferential portion of the optical element, because the antireflective film is provided on each of both surfaces of each optical element main body.

The structure described in Item 11 is the optical element described in either one of Item 1-Item 10, wherein the antireflective film is made of at least two types of materials among those including low refractive index materials having refractive index n for light with wavelength 500 nm satisfying $1.3 \leq n \leq 1.55$ and high refractive index materials having refractive index n for light with wavelength 500 nm satisfying $1.7 \leq n \leq 2.5$.

The structure described in Item 11 makes it possible to obtain the same effect as that of the structure described in either one of Item 1-Item 10.

The structure described in Item 12 is the optical element described in Item 11, wherein the low refractive index material is one whose main component contains $MgF_2$ or $SiO_2$, while, the high refractive index material is one whose main component contains $TiO_2$, $Ta_2O_5$, $CeO_2$ $ZrO_2$, $HfO_2$ or $CeF_3$.

The structure described in Item 12 makes it possible to obtain the same effect as that of the structure described in Item 11.

The structure described in Item 13 is the optical element described in either one of Item 1-Item 10, wherein the antireflective film is made of at least three types of materials among those including low refractive index materials having refractive index n for light with wavelength 500 nm satisfying $1.3 \leq n \leq 1.55$, medium refractive index materials having refractive index n for light with wavelength 500 nm satisfying $1.55 \leq n \leq 1.7$ and high refractive index materials having refractive index n for light with wavelength 500 nm satisfying $1.7 \leq n \leq 2.5$.

The structure described in Item 13 makes it possible to obtain the same effect as that of the structure described in either one of Item 1-Item 10.

The structure described in Item 14 is the optical element described in Item 13, wherein the low refractive index material is one whose main component contains $MgF_2$ or $SiO_2$, the medium refractive index material is one whose main component contains $Al_2O_3$, while, the high refractive index material is one whose main component contains $TiO_2$, $Ta_2O_5$, $CeO_2$ $ZrO_2$, $HfO_2$ or $CeF_3$.

The structure described in Item 14 makes it possible to obtain the same effect as that of the structure described in Item 13.

The structure described in Item 15 is the optical element described in either one of Item 1-Item 14, wherein the numerical aperture of the objective lens is 0.65 or more.

The structure described in Item 15 makes it possible to conduct recording and/or reproducing for an information recording medium such as a blue-ray disc or AOD, because the numerical aperture of the objective lens is 0.65 or more.

The structure described in Item 16 is the optical element described in either one of Item 1-Item 15, wherein the optical element main body is made of plastic.

As plastic in this case, optical plastic such as polycarbonate resin, polymethylmethacrylate resin, norbornene resin or alicyclic olefin resin can be used. Incidentally, as norbornene resin, it is preferable to use a polyolefin type one.

The structure described in Item 16 makes it possible to obtain the same effect as that of the structure described in either one of Item 1-Item 15.

The structure described in Item 17 is the optical element described in either one of Item 1-Item 15, wherein the optical element main body is made through glass molding.

As glass in this case, materials for low melting point glass molding can be used, and specifically, M-BaCV5 (Product Name, made by HOYA) can be used.

The structure described in Item 17 makes it possible to obtain the same effect as that of the structure described in either one of Item 1-Item 15.

The structure described in Item 18 is the optical element described in either one of Item 1-Item 17, wherein a primary coat lies between the optical element main body and the antireflective film, and refractive index $n_o'$ of the primary coat satisfies $|n_o'-n_o| \leq 0.1$ when $n_o$ represents the refractive index of the optical element main body.

The structure described in Item 18 makes it possible to improve sticking properties of the antireflective film for the optical element main body, because the primary coat lies between the optical element main body and the antireflective film.

Further, it is possible to prevent deterioration of the optical function caused by the primary coat provided, because the refractive index $n_o'$ of the primary coat satisfies $|n_o'-n_o| \leq 0.1$ for the refractive index $n_o$ of the optical element main body.

The structure described in Item 19 is an optical pickup device wherein the optical element described in either one of Items 1-18 and a laser light source are provided, and when a laser beam emitted from the laser light source is converged on an optical recording medium by the optical element, and at least one of recording of information on the optical recording medium and reproducing of information recorded on the optical recording medium can be carried out.

The structure described in Item 19 makes it possible to obtain the same effect as that of the structure described in either one of Item 1-Item 18.

The structure described in Item 20 is an optical pickup device wherein the optical element described in Items 19 and at least one of light fluxes having a plurality of wavelengths entering into the optical element is a linear polarized light. Herein, a state of light before it enters into the optical element can be circular or elliptic polarized light and a device such as ½ wavelength plane or ¼ wavelength plane can be included in the optical path.

The structure described in Item 20 makes it possible to obtain the same effect as that of the structure described in either one of Item 19.

More detailed embodiments of the invention will be explained as follows, referring to the drawings.

First Embodiment

First, an embodiment of the optical pickup device relating to the invention will be explained.

FIG. 1 is a diagram of a schematic structure of optical pickup device 1 in the First Embodiment.

As shown in the drawing, the optical pickup device 1 is provided with first laser light source 2a and second laser light source 2b both emit a laser beam.

The first laser light source 2a is one that emits a first laser beam having wavelength λ1 which satisfies 380 nm ≦λ1≦450 nm, and it is λ1=405 nm in the present embodiment. This wavelength λ1 is a working wavelength for AOD (information recording medium) 100. Incidentally, thickness t1 of protective base board 101 of AOD 100 satisfies 0.5 mm≦t1≦0.7 mm.

The second laser light source 2b is one that emits a second laser beam having wavelength λ2 which satisfies 640 nm ≦λ2≦680 nm, and it is λ2=650 nm in the present embodiment. This wavelength λ2 is a working wavelength for DVD (information recording medium) 200. Incidentally, thickness t2 of protective base board 201 of DVD 200 satisfies 0.5 mm≦t2≦0.7 mm.

Laser beams emitted respectively from the first laser light source 2a and the second laser light source 2b are converged by light-converging optical system 3 respectively on AOD 100 and DVD 200.

The light-converging optical system 3 has therein first and second collimator lenses 30a and 30b, first-third beam splitters 31a-31c and objective lens (optical element) 5.

Each of the first and second collimator lenses 30a and 30b is arranged to make each of laser beams emitted respectively from the first laser light source 2a and the second laser light source 2b to be collimated light.

The beam splitter 31a is arranged to transmit a first laser beam emitted from the first laser light source 2a toward objective lens 5, and to guide a beam of light reflected on AOD 100, namely, returned light to the first photodetector 4a. Between the beam splitter 31a and the first photodetector 4a, there is arranged sensor lens group 33a.

The beam splitter 31b is arranged to transmit a second laser beam emitted from the second laser light source 2b toward beam splitter 31c, and to guide a beam of light reflected on DVD 200 to the second photodetector 4b. Between the beam splitter 31b and the second photodetector 4b, there is arranged sensor lens group 33b.

The beam splitter 31c is arranged to put both the first laser beam emitted from the first laser light source 2a and the second laser beam emitted from the second laser light source 2b on the same optical path.

Figure 2:
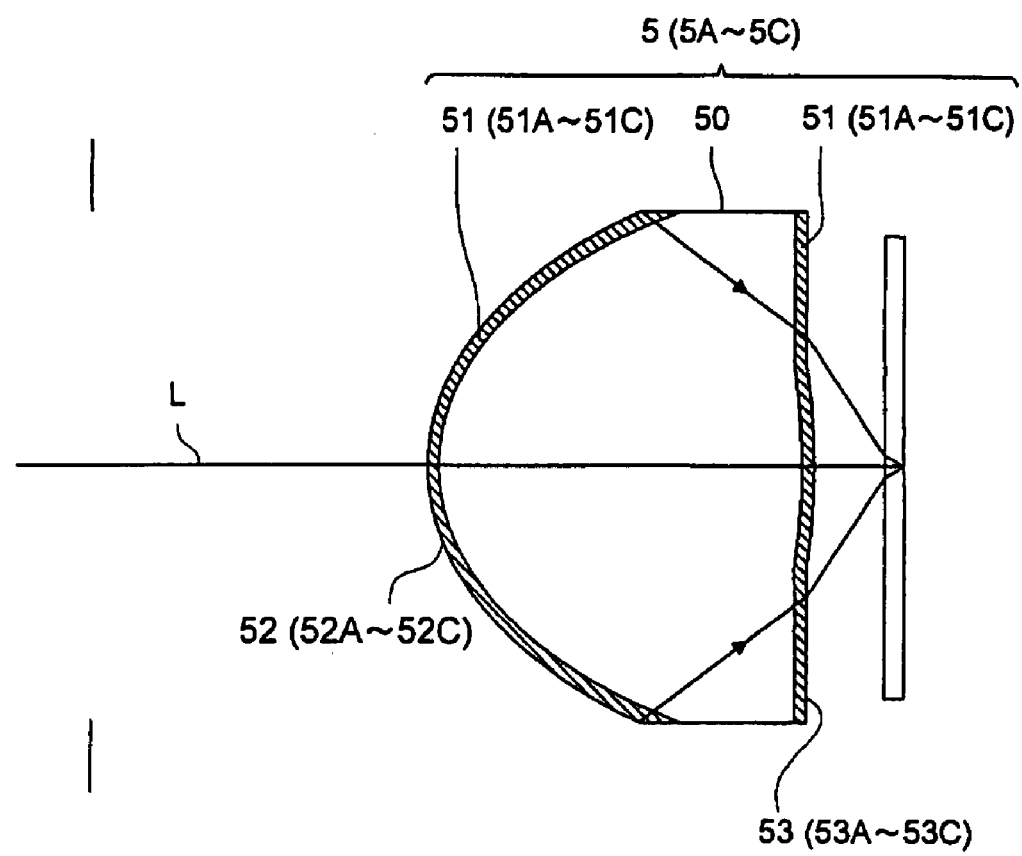
FIG. 2 is a longitudinal cross-sectional view showing an objective lens relating to an embodiment of the invention.

The objective lens 5 is provided with lens main body (optical element main body) 50 and with antireflective film 51 having antireflective functions for the first laser beam and the second laser beam as shown in FIG. 2, and it is housed in a two-dimensional actuator (not shown) movable in the prescribed direction. A numerical aperture of the objective lens 5 if 0.65.

Lens main body 50 is made through plastic molding or through glass molding. As plastics used for the lens main body 50, it is possible to use optical plastics such as polycarbonate resin, polymethylmethacrylate resin, norbornene resin and alicyclic olefin resin. Incidentally, as the norbornene resin, it is preferable to use polyolefin resin. As glass to be used for the lens main body 50, glass materials for low melting point glass molding can be used, and specifically, M-BaCD5 (product name, made by HOYA) can be used.

Antireflective film 51 is provided on at least one surface of lens main body 50, and in this particular case of the present embodiment, it is provided on each of both sides of the lens main body to be optical functional surfaces 52 and 53.

Reflectance $R_{p1}$ for P polarized light and reflectance $R_{s1}$ for S polarized light both for the first laser beam respectively on optical functional surfaces 52 and 53 satisfy $|Rp_1-Rs_1|\leq 2\%$ and $(Rp_1+Rs_1)/2\leq 5\%$, when angle $\theta_1$ formed by each of optical functional surfaces 52 and 53 and the first laser beam satisfies $0°\leq\theta_1\leq 60°$.

Reflectance $Rp_2$ for P polarized light and reflectance $Rs_2$ for S polarized light both for the second laser beam respectively on optical functional surfaces 52 and 53 satisfy $|Rp_2-Rs_2|\leq 4\%$ and $(Rp_2+Rs_2)/2\leq 5\%$, when angle $\theta_2$ formed by each of optical functional surfaces 52 and 53 and the second laser beam satisfies $0°\leq\theta_2\leq 50°$.

The antireflective film 51 is made of at least two types of materials among those including low refractive index materials having refractive index n for light with wavelength 500 nm satisfying $1.3\leq n\leq 1.55$ and high refractive index materials having refractive index n for light with wavelength 500 nm satisfying $1.7\leq n\leq 2.5$ to be in a layer structure from two layers to 30 layers. As low refractive index materials in this case, it is possible to use materials whose main component contains $MgF_2$ or $SiO_2$. As high refractive index materials, it is possible to use materials whose main component contains $TiO_2$, $Ta_2O_5$, $CeO_2$ $ZrO_2$, $HfO_2$ or $CeF_3$. Methods such as vacuum evaporation, sputtering, CVD and coating.

Incidentally, it is preferable to make a primary coat (not shown) to lie between the lens main body 50 and the antireflective film 51. In this case, it is possible to improve sticking properties of the antireflective film 51 for the lens main body 50. Further, it is preferable that refractive index $n_o'$ of the primary coat satisfies $|n_o'-n_o|\leq 0.1$ for refractive index $n_o$ of the lens main body 50. In this case, there turns into the state wherein deterioration of optical functions caused by the primary coat provided is prevented.

Since the operations of optical pickup device 1 structured as stated above are known, detailed explanation for them will be omitted here, and the first laser beam emitted from the first laser light source 2a passes through the first beam splitter 31a, and then, is made to be collimated light in the first collimator lens 30a, to pass through the third beam splitter 31c.

Next, the first laser beam is converged by objective lens 5 on an information recording surface of AOD 100, and forms a spot on optical axis L. In this case, transmittance of P polarized light and S polarized light of each of the first and second laser beams on the outer circumferential portion of optical functional surfaces 52 and 53 for are high respectively to the same level, and therefore, decline of an amount of transmitted light and deterioration of the state of polarization are prevented on the outer circumferential portion of the lens and a beam spot for each of the first laser beam and the second laser beam is in an excellent form.

Next, the first laser beam which has formed a spot is modulated on an information recording surface by information pits and is reflected to pass again through objective lens 5, third beam splitter 31c and first collimator lens 30a, to be reflected on the first beam splitter 31a to be branched.

Then, the first laser beam thus branched passes through sensor lens group 33a to enter the first photodetector 4a. The first photodetector 4a detects a spot of the incident light to output signals, and uses the outputted signals to obtain reading signals for information recorded in AOD 100.

Further, detection of focusing and detection of tracking are conducted by detecting changes in quantity of light caused by changes in a form and changes in a position of a spot on the first photodetector 4a. Based on results of the detections, the two-dimensional actuator makes the objective lens 5 to move in the focusing direction and the tracking direction so that the first laser beam may form a spot accurately on the information recording surface.

On the other hand, the second laser beam emitted from the second laser light source 2b passes through the second beam splitter 31b, and then, is made to be collimated light in the second collimator lens 30b, and is reflected on third beam splitter 31c to arrive at objective lens 5.

Next, the second laser beam is converged by objective lens 5 on an information recording surface of DVD 200, and forms a spot on optical axis L. In this case, transmittance of each of the outer circumferential portion of optical functional surfaces 52 and 53 for P polarized light of each of the first and second laser beams and that of each of optical functional surfaces 52 and 53 for S polarized light of each of the first and second laser beams are high respectively to the same level, and therefore, a beam spot for the first laser beam and that for the second laser beam are in an excellent form.

Next, the second laser beam which has formed a spot is modulated on an information recording surface by information pits and is reflected to pass again through objective lens 5, and is reflected on the third beam splitter 31c to be branched.

Then, the second laser beam thus branched passes through the second collimator lens 30b to be reflected on the second beam splitter 31b to be branched, and it enters the second photodetector 4b after passing through sensor lens group 33a. After that, it follows the same way as in the case of the first laser beam.

In the optical pickup device 1 stated above, beam spots for the first laser beam and the second laser beam can be made to be in an excellent form, and therefore, an amount of incident light for each of the first and second photodetectors 4a and 4b is not reduced and no distortion is generated on the signals, which is different from the past. It is therefore possible to conduct accurate recording and/or reproducing of information by using the first and second laser beams.

Incidentally, in the present embodiment, an explanation has been given under the condition that a wavelength of the second laser light source ranges from 640 to 680 nm. However, the wavelength of the second laser light source may also range from 750 to 850 nm. In this case, CD can be used in place of DVD 200 as an information recording medium.

Second Embodiment

Next, a second embodiment of the optical pickup device relating to the invention will be explained. Incidentally, structural elements which are the same as those in the first embodiment are given the same symbols, and explanation for them will be omitted here.

Optical pickup device 1A in the present second embodiment is provided with objective lens 5A in place of the objective lens 5, which is different from the aforesaid optical pickup device 1.

The objective lens 5A is provided with lens main body 50 and antireflective film 51A, as shown in FIG. 2.

The antireflective film 51A is provided on at least one surface of lens main body 50, and in this particular case of the present embodiment, it is provided on each of both sides of the lens main body to be optical functional surfaces .52A and 53A.

Reflectance $Rp_1$ for P polarized light and reflectance $Rs_1$ for S polarized light both for the first laser beam respectively on optical functional surfaces 52A and 53A satisfy $|Rp_1-Rs_1| \leq 2\%$ and $(Rp_1+Rs_1)/2 \leq 5\%$, when angle $\theta_1$ formed by each of optical functional surfaces 52A and 53A and the first laser beam satisfies $0° \leq \theta_1 \leq 60°$.

Reflectance $Rp_2$ for P polarized light and reflectance $Rs_2$ for S polarized light both for the second laser beam respectively on optical functional surfaces 52A and 53A satisfy $|Rp_2-Rs_2| \leq 4\%$ and $(Rs_2+Rs_2)/2 \leq 5\%$, when angle $\theta_2$ formed by each of optical functional surfaces 52A and 53A and the second laser beam satisfies $0° \leq \theta_2 \leq 50°$.

The antireflective film 51A is made of at least three types of materials among those including low refractive index materials having refractive index n for light with wavelength 500 nm satisfying $1.3 \leq n \leq 1.55$, medium refractive index materials having refractive index n for light with wavelength 500 nm satisfying $1.55 \leq n \leq 1.7$ and high refractive index materials having refractive index n for light with wavelength 500 nm satisfying $1.7 \leq n \leq 2.5$, to be of 3-30 layers. In this case, a material whose main component contains $MgF_2$ or $SiO_2$ can be used as a low refractive index material, a material whose main component contains $Al_2O_3$ can be used as a medium refractive index material, and a material whose main component contains $TiO_2$, $Ta_2O_5$, $CeO_2$ $ZrO_2$, $HfO_2$ or $CeF_3$ can be used as a high refractive index material.

Actions of the aforementioned optical pickup device 1A are the same as those of the optical pickup device 1 in the First Embodiment.

Even in the case of the optical pickup device 1A, it is possible to obtain the effect which is the same as that in the First Embodiment.

Third Embodiment

Next, a third embodiment of the optical pickup device relating to the invention will be explained. Incidentally, structural elements which are the same as those in the first embodiment are given the same symbols, and explanation for them will be omitted here.

Figure 3:
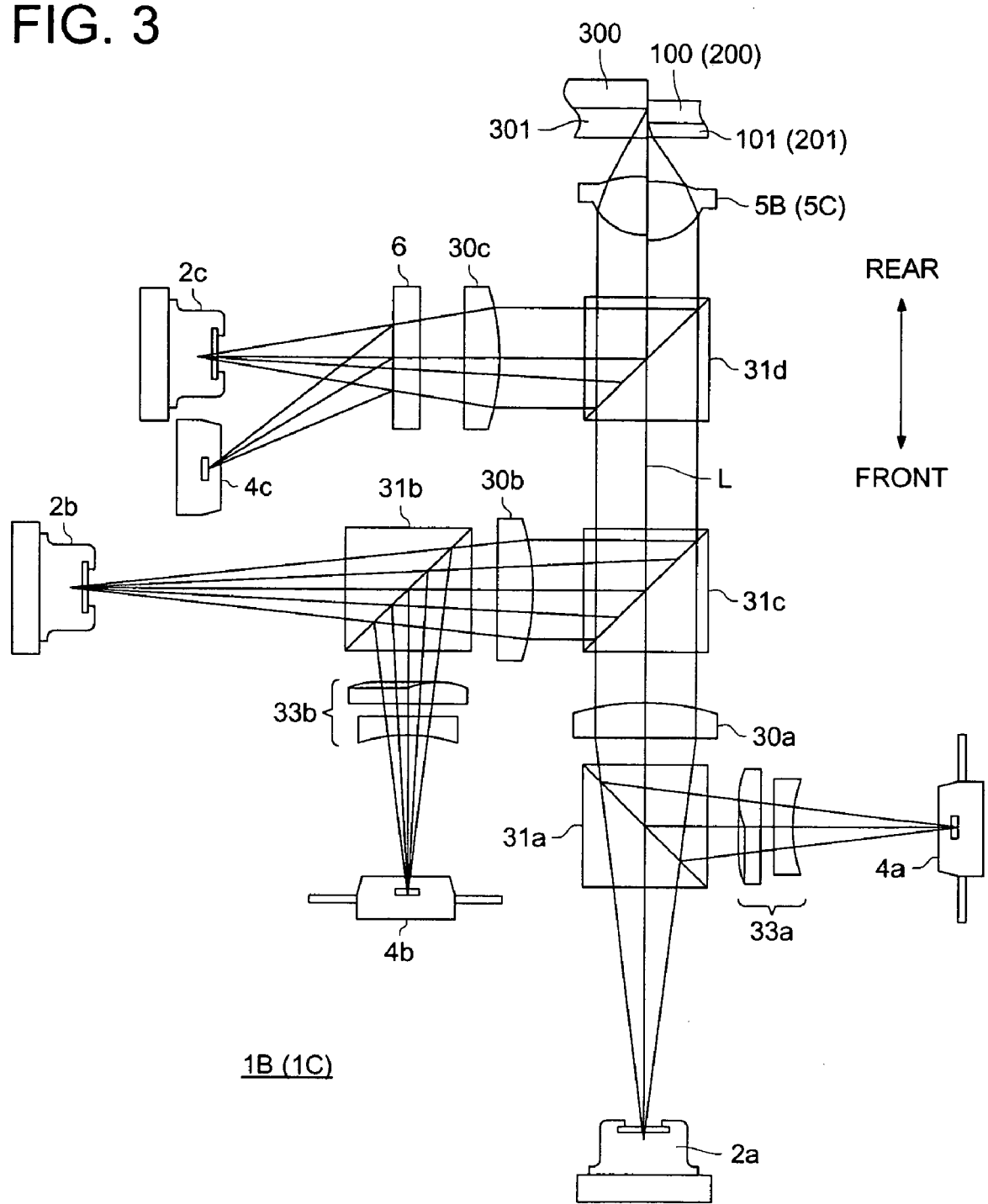
FIG. 3 is a diagram showing a schematic structure of another embodiment of an optical pickup device relating to the embodiment of the invention.

FIG. 3 is a schematic structural diagram of optical pickup device 1B in the Third Embodiment.

As shown in this diagram, the optical pickup device 1B is further provided with third laser light source 2c, collimator lens 30c, beam splitter 31d and diffraction plate 6, and is further provided with objective lens 5B in place of the objective lens 5, which is different from the optical pickup device 1 in the First Embodiment.

The third laser light source 2c is one that emits a third laser beam having wavelength λ3 which satisfies 750 nm ≦λ3≦850 nm, and it is λ3=780 nm in the present embodiment. This wavelength λ3 is a working wavelength for CD (third information recording medium) 300. Incidentally, thickness t3 of protective base board 301 of CD 300 satisfies 1.1 mm≦t3≦1.3 mm.

The third collimator lens 30c is arranged to make the third laser beam emitted from the third laser light source 2c to be collimated light.

The beam splitter 31d is arranged to put the third laser beam emitted from the third laser light source 2c and the first and second laser beams both transmitted through beam splitter 31c on the same optical path. Between the beam splitter 31d and the third laser light source 2c, there is arranged diffraction plate 6 that guides reflected light coming from CD 300 to the third photodetector 4c.

As shown in FIG. 2., the objective lens 5B is provided with lens main body (optical element main body) 50 and antireflective film 51B having antireflective functions for the first, second and third laser beams.

Antireflective film 51B is provided on at least one surface of lens main body 50, and in this particular case of the present embodiment, it is provided on each of both sides of the lens main body to be optical functional surfaces 52B and 53B.

Reflectance $Rp_1$ for P polarized light and reflectance $Rs_1$ for S polarized light both for the first laser beam respectively on optical functional surfaces 52B and 53B satisfy $|Rp_1-Rs_1|\leq 2\%$ and $(Rp_1+Rs_1)/2\leq 5\%$, when angle $\theta_1$ formed by each of optical functional surfaces 52B and 53B and the first laser beam satisfies $0°\leq\theta_1\leq 60°$.

Reflectance $Rp_2$ for P polarized light and reflectance $Rs_2$ for S polarized light both for the second laser beam respectively on optical functional surfaces 52B and 53B satisfy $|Rp_2-Rs_2|\leq 4\%$ and $(Rp_2+Rs_2)/2\leq 5\%$, when angle $\theta_2$ formed by each of optical functional surfaces 52B and 53B and the second laser beam satisfies $0°\leq\theta_2\leq 50°$.

Reflectance $Rp_3$ for P polarized light and reflectance $Rs_3$ for S polarized light both for the third laser beam respectively on optical functional surfaces 52B and 53B satisfy $|Rp_3-Rs_3|\leq 4\%$ and $(Rp_3+Rs_3)/2\leq 5\%$, when angle $\theta_3$ formed by each of optical functional surfaces 52B and 53B and the third laser beam satisfies $0°\leq\theta_3\leq 50°$.

The antireflective film 51B is made of at least two types of materials among those including low refractive index materials having refractive index n for light with wavelength 500 [nm] satisfying 1.3 ≦n≦1.55 and high refractive index materials having refractive index n for light with wavelength. 500 [nm] satisfying 1.7≦n≦2.5 to be in a layer structure from four layers to 30 layers.

Among actions of the optical pickup device 1B structured in the aforesaid manner, those for conducting recording and/or reproducing for AOD 100 and DVD 200 are the same as those in the optical pickup device 1 in the First Embodiment.

Further, with respect to actions for conducting recording and/or reproducing for CD 300 among those of the optical pickup device 1B, a third laser beam emitted from the third laser light source 2c passes through diffraction plate 6 first, and then is collimated by the third collimator lens 30c, and is reflected by the fourth beam splitter 31d to arrive at objective lens 5B.

Next, the third laser beam is converged on an information recording surface of CD 300 by objective lens 5B, and it forms a spot on optical axis L. In this case, transmittance of P polarized light and S polarized light of each of the first and second laser beams on the outer circumferential portion of optical functional surfaces 52 and 53 for are high respectively to the same level, and therefore, decline of an amount of transmitted light and deterioration of the state of polarization are prevented on the outer circumferential portion of the lens and a beam spot for each of the first laser beam and the second laser beam is in an excellent form.

Next, the third laser beam which has formed a spot is modulated by information pits and is reflected on an information recording surface to pass again through objective lens 5B, and is reflected on the fourth beam splitter 31d to be branched.

Then, the third laser beam thus branched passes through the third collimator lens 30c, and is changed in terms of its course when it passes through diffraction plate 6, to enter the third photodetector 4c. Actions thereafter are the same as those in the case of the first laser beam.

In the optical pickup device 1B stated above, beam spots for the first-third laser beams can be made to be in an excellent form, and therefore, an amount of incident light for each of the first-third photodetectors 4a, 4b and 4c is not reduced, which is different from the past. It is therefore possible to conduct accurate recording and/or reproducing of information by using the first-third laser beams.

Fourth Embodiment

Optical pickup device 1C in the present Fourth Embodiment is provided with objective lens 5C in place of objective lens 5B, which is different from the third optical pickup device 1B.

The objective lens 5C is provided with lens main body (optical element main body) 50 and antireflective film 51C.

The antireflective film 51C is provided on at least one surface of lens main body 50, and in this particular case of the present embodiment, it is provided on each of both sides of the lens main body to be optical functional surfaces 52C and 53C.

Reflectance $Rp_1$ for P polarized light and reflectance $Rs_1$ for S polarized light both for the first laser beam respectively on optical functional surfaces 52C and 53C satisfy $|Rp-Rs_1|\leq 2\%$ and $(Rp_1+Rs_1)/2\leq 5\%$, when angle $_1$ formed by each of optical functional surfaces 52C and 53C and the first laser beam satisfies $0°\leq\theta_1\leq 60°$.

Reflectance $Rp_2$ for P polarized light and reflectance $Rs_2$ for S polarized light both for the second laser beam respectively on optical functional surfaces 52C and 53C satisfy $|Rp_2-Rs_2|\leq 4\%$ and $(Rp_2+Rs_2)/2\leq 5\%$, when angle $\theta_2$ formed by each of optical functional surfaces 52C and 53C and the second laser beam satisfies $0°\leq\theta_2\leq 50°$.

Reflectance $Rp_3$ for P polarized light and reflectance $Rs_3$ for S polarized light both for the third laser beam respectively on optical functional surfaces 52C and 53C satisfy $|Rp_3-Rs_3|\leq 4\%$ and $(Rp_3+Rs_3)/2\leq 5\%$, when angle $\theta_3$ formed by each of optical functional surfaces 52C and 53C and the third laser beam satisfies $0°\leq\theta_3\leq 50°$.

The antireflective film 51C is made of at least three types of materials among those including low refractive index materials having refractive index n for light with wavelength 500 nm satisfying 1.3≦n<1.55, medium refractive index materials having refractive index n for light with wavelength 500 nm satisfying 1.55≦n≦1.7 and high refractive index materials having refractive index n for light with wavelength 500 [nm] satisfying 1.7≦n≦2.5.

Actions of the aforementioned optical pickup device 1C are the same as those of the optical pickup device 1B in the Third Embodiment.

Even in the case of the optical pickup device 1C, it is possible to obtain the effect which is the same as that in the Third Embodiment.

Figure 4:
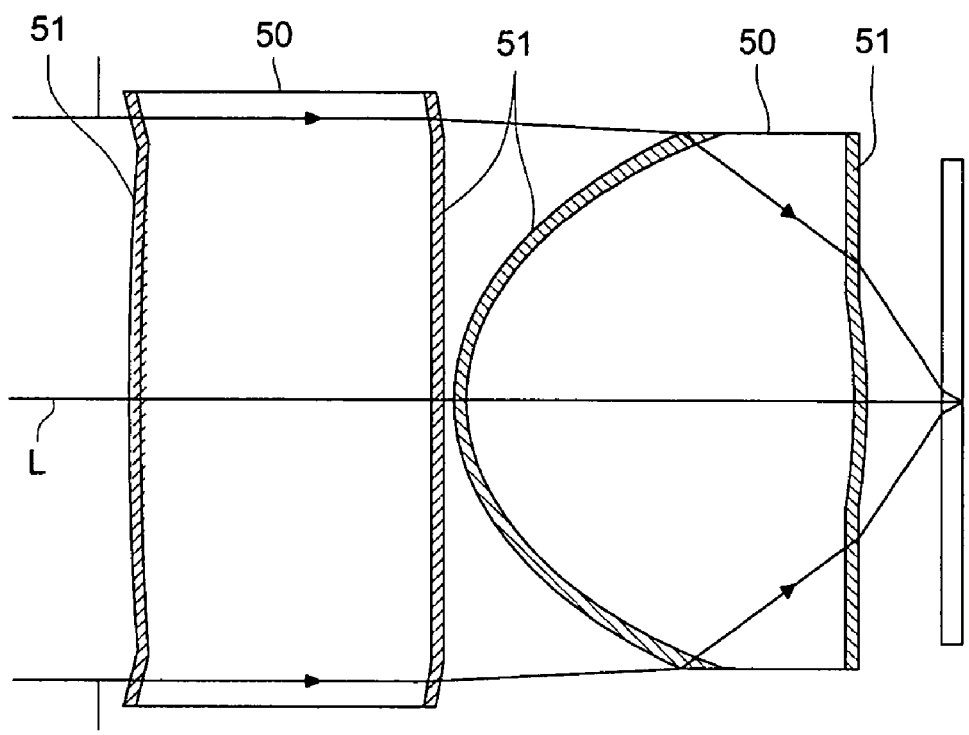
FIG. 4 is a longitudinal cross-sectional view showing an objective lens relating to another embodiment of the invention.

Incidentally, in the First-Fourth Embodiments, each of objective lenses 5 and 5A-5C has been explained to be equipped with lens main body 50 and antireflective films 51 provided on both surfaces of the lens main body 50. However, as shown in FIG. 4, it is also possible either to arrange so that the objective lens is provided with two lens main bodies 50 and with antireflective films 51 provided on both surfaces of each lens main body 50, or to arrange so that the objective lens is provided with two or more lens main bodies 50 and with antireflective films 51 provided on both surfaces of each lens main body 50.

Though there has been explained under the condition that a laser beam of linearly polarized light enters each of objective lenses 5 and 5A-5C, it is also possible to arrange so that a laser beam converted by a ¼ wavelength plate into a circularly polarized light may enter. In this case, it is possible to conduct conversion from linearly polarized light to circularly polarized light, or from circularly polarized light to linearly polarized light, almost surely, by making P polarized light and S polarized light to be transmitted through an outer circumferential portion of each of objective lenses 5 and 5A-5C to the same extent.

Though there has been given an explanation wherein an optical element is represented by objective lens 5, it is also possible to make the optical element to be a beam shrinker or a beam expander.

In addition, although a numerical aperture of each of objective lenses 5 and 5A-5C has been made 0.65, it may also be made to be 0.85-0.9. In this case, a blue ray disc having a 0.1 mm-thick protective base board can be used as an information recording medium, in place of AOD 100.

EXAMPLE

The invention will be explained more specifically as follows, referring to the following Examples and Comparative Examples. Incidentally, in the following Examples, let it be assumed that wavelength $\lambda 1$ is 405 nm, $\lambda 2$ is 650 nm and $\lambda 3$ is 780 nm.

Example 1-1

In Example 1-1, the objective lens 5 in the First Embodiment was constructed as shown in Table 1. Incidentally, the lens main body was formed by the use of BK7 (trade name: made by Shot Glass Co.)

TABLE 1

| Layer | Material | Index | Thickness |
|---|---|---|---|
| Air | | 1 | |
| 7 | $SiO_2$ | 1.47 | 98.22 |
| 6 | $Ta_2O_5$ | 2.12 | 47.90 |
| 5 | $SiO_2$ | 1.47 | 15.00 |
| 4 | $Ta_2O_5$ | 2.12 | 64.02 |
| 3 | $SiO_2$ | 1.47 | 35.44 |
| 2 | $Ta_2O_5$ | 2.12 | 15.44 |
| 1 | $SiO_2$ | 1.47 | 239.00 |
| Lens | BK7 | 1.53 | |

Special reflection characteristics on optical functional surfaces 52 and 53 of the objective lens 5 were measured. Further, there was measured the relationship between an angle of incidence of the first laser beam on the optical functional surfaces 52 and 53 and reflectance of P polarized light and S polarized light.

Figure 5A:
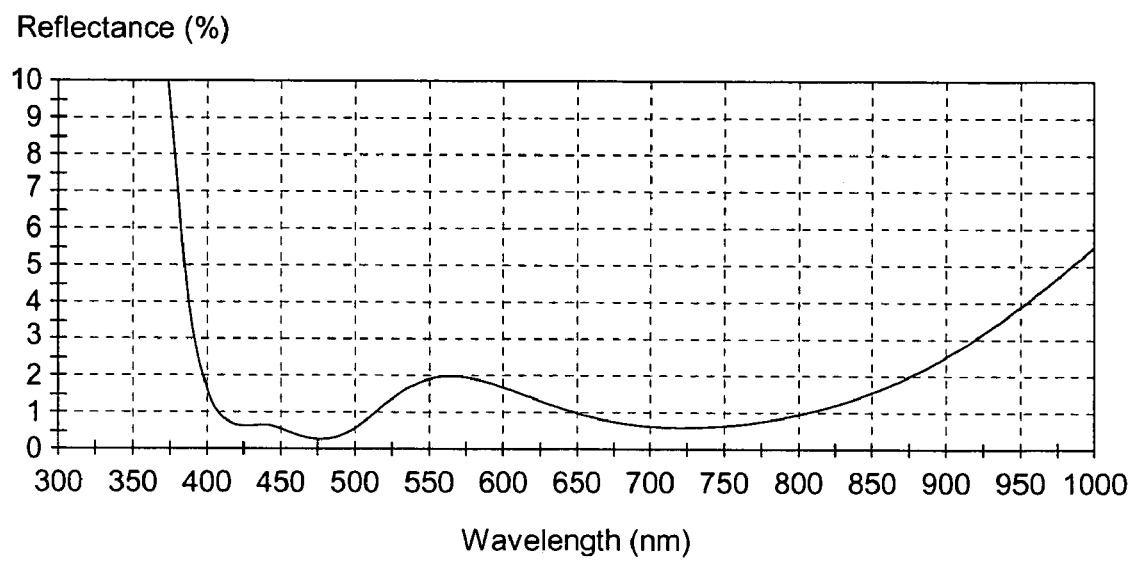
FIG. 5(a) is a diagram showing a spectral reflection curve in an objective lens in Example 1-1.
Figure 5B:
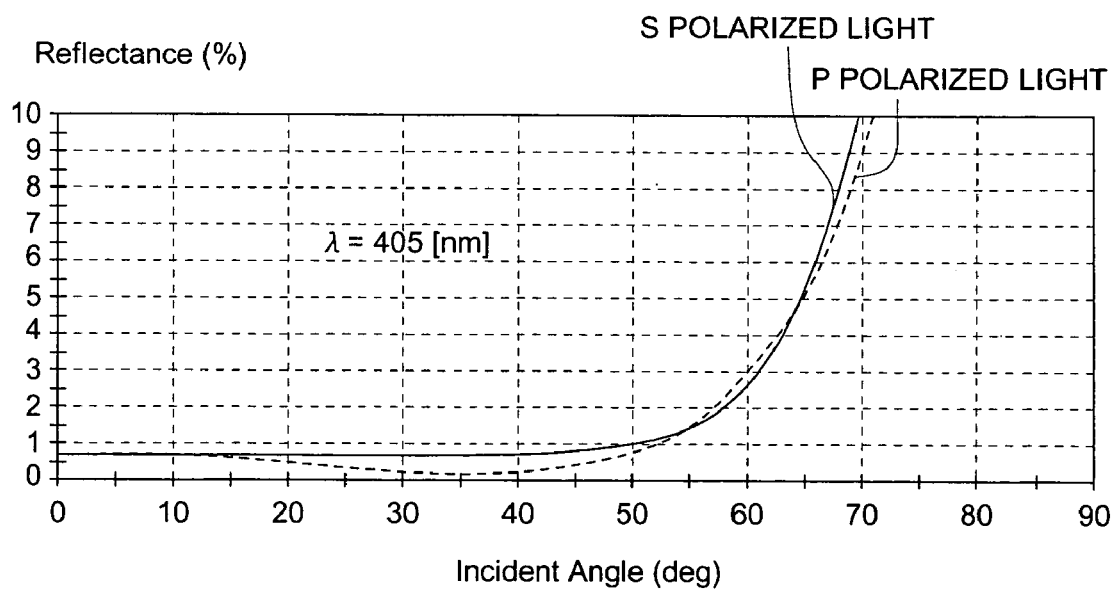
FIG. 5(b) is a diagram showing relationship between an angle of incidence for the objective lens and reflectance for P polarized light and S polarized light.

After the measurement, the reflectance on the optical functional surfaces 52 and 53 showed the minimum value to be 1% or less in the vicinity of wavelengths $\lambda 1$ and $\lambda 2$, as shown in FIG. 5(*a*). The wavelength that makes the reflectance to be minimum was one that is longer than the wavelengths $\lambda 1$ and $\lambda 2$. Therefore, it is understood that the objective lens 5 in Example 1-1 antireflective functions for the first laser beam with wavelength $\lambda 1$ and the second laser beam with wavelength $\lambda 2$, in particular, a decline of antireflective functions is prevented even on the area where an angle of incidence of a laser beam is large, namely, on the outer circumferential portion of the objective lens 5. Accordingly, it is preferable that antireflective film 51 of the objective lens 5 is applied to an optical element having an area where an angle of incidence and an angle of emergence of a laser beam are large.

Further, reflectance for P polarized light and that for S polarized light in the first laser beam agreed substantially with each other independently of an angle of incidence and an angle of emergence, as shown in FIG. 5(*b*). It is therefore understood that the objective lens 5 controls disturbance of the state of polarization for the first laser beam.

The foregoing shows that a decline of an amount of transmitted light is prevented and disturbance of the state of polarization is controlled in the objective lens 5, thereby, reliability of recording and reproducing can be enhanced.

Example 1-2

In Example 1-2, the objective lens 5 in the First Embodiment was constructed as shown in Table 2.

TABLE 2

| Layer | Material | Index | Thickness |
|---|---|---|---|
| Air | | 1 | |
| 16 | $MgF_2$ | 1.38 | 112.06 |
| 15 | $TiO_2$ | 2.32 | 30.24 |
| 14 | $MgF_2$ | 1.38 | 15.66 |
| 13 | $TiO_2$ | 2.32 | 74.49 |
| 12 | $MgF_2$ | 1.38 | 21.75 |
| 11 | $TiO_2$ | 2.32 | 22.45 |
| 10 | $MgF_2$ | 1.38 | 22.77 |
| 9 | $TiO_2$ | 2.32 | 11.24 |
| 8 | $MgF_2$ | 1.38 | 53.31 |
| 7 | $TiO_2$ | 2.32 | 24.68 |
| 6 | $MgF_2$ | 1.38 | 29.86 |
| 5 | $TiO_2$ | 2.32 | 137.95 |
| 4 | $MgF_2$ | 1.38 | 23.27 |
| 3 | $TiO_2$ | 2.32 | 22.01 |
| 2 | $MgF_2$ | 1.38 | 40.85 |
| 1 | $TiO_2$ | 2.32 | 6.13 |
| Lens | BK7 | 1.52 | |

Spectral reflection characteristics on optical functional surfaces 52 and 53 of the objective lens 5 were measured. Further, there was measured the relationship between an angle of incidence for each of the first and second laser beams on the optical functional surfaces 52 and 53 and reflectance of P polarized light and S polarized light.

Figure 6:
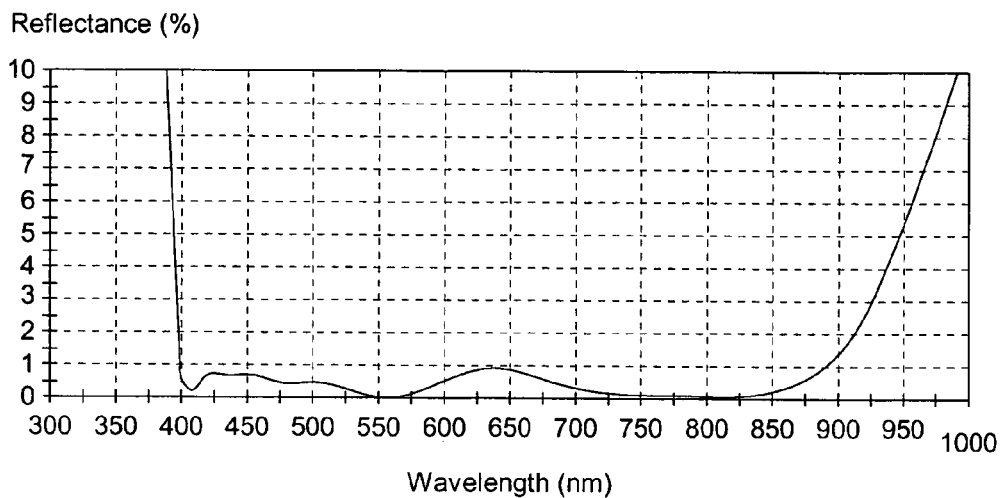
FIG. 6(a) is a diagram showing a spectral reflection curve in an objective lens in Example 1-2, and each of FIGS. 6(b) and 6(c) is a diagram showing relationship between an angle of incidence for the objective lens and reflectance for P polarized light and S polarized light.
Figure 6:
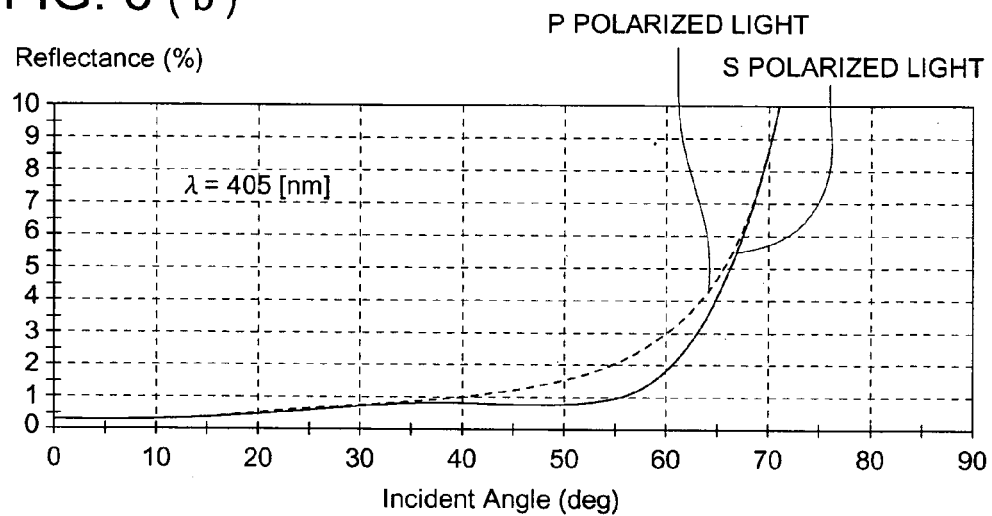
Figure 6:
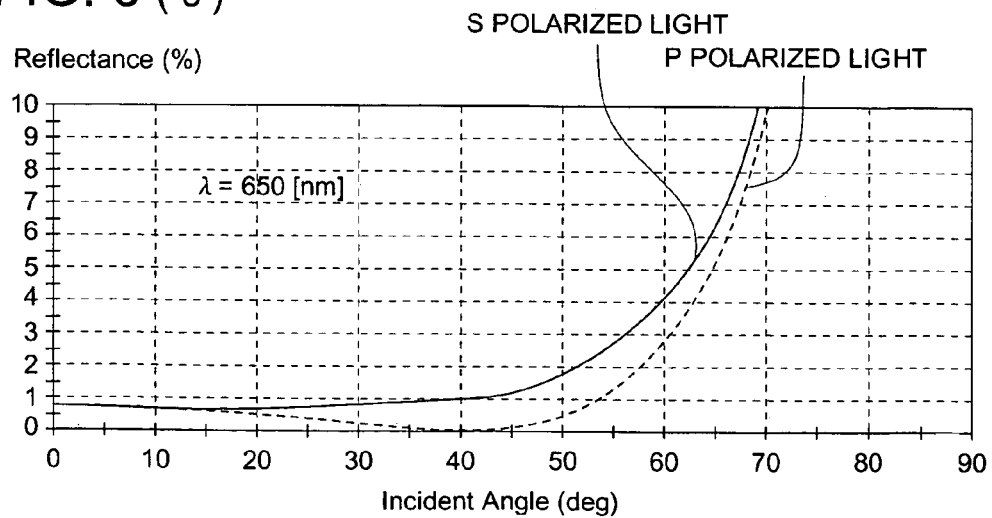

After the measurement, the reflectance on the optical functional surfaces 52 and 53 showed the minimum value to be 1% or less in a broad wavelength area including the neighborhood of wavelengths $\lambda 1$ and $\lambda 2$, as shown in FIG. 6(*a*). The wavelength that makes the reflectance to be minimum was one that is longer than the wavelengths $\lambda 1$ and $\lambda 2$. Therefore, it is understood that the objective lens 5 in Example 1-2 has antireflective functions for the first and the second laser beams, and in particular, a decline of antireflective functions is prevented even on the area where angles of incidence and emergence of a laser beam are large, namely, on the outer circumferential portion of the objective lens 5. Accordingly, it is preferable that antireflective film 51 of the objective lens 5 is applied to an optical element having an area where an angle of incidence and an angle of emergence of a laser beam are large.

Further, reflectance for P polarized light and that for S polarized light in the first and second laser beams agreed substantially with each other independently of an angle of incidence and an angle of emergence, as shown in FIGS. 6(*b*) and 6(*c*). It is therefore understood that the objective lens 5 controls disturbance of the state of polarization for the first and second laser beams.

The foregoing shows that a decline of an amount of transmitted light is prevented and disturbance of the state of polarization is controlled in the objective lens 5, thereby, reliability of recording and reproducing can be enhanced.

Example 2-1

In Example 2-1, the objective lens 5A in the Second Embodiment was constructed as shown in Table 3.

TABLE 3

| Layer | Material | Index | Thickness |
|---|---|---|---|
| Air |  | 1 |  |
| 5 | MgF$_2$ | 1.39 | 88.67 |
| 4 | TiO$_2$ | 2.50 | 91.03 |
| 3 | Al$_2$O$_3$ | 1.65 | 66.59 |
| 2 | MgF$_2$ | 1.39 | 126.62 |
| 1 | Al$_2$O$_3$ | 1.65 | 127.62 |
| Lens | BK7 | 1.53 |  |

Spectral reflection characteristics on optical functional surfaces 52A and 53A of the objective lens 5A were measured. Further, there was measured the relationship between an angle of incidence of the first laser beam on the optical functional surfaces 52A and 53A and reflectance of P polarized light and S polarized light.

Figure 7:
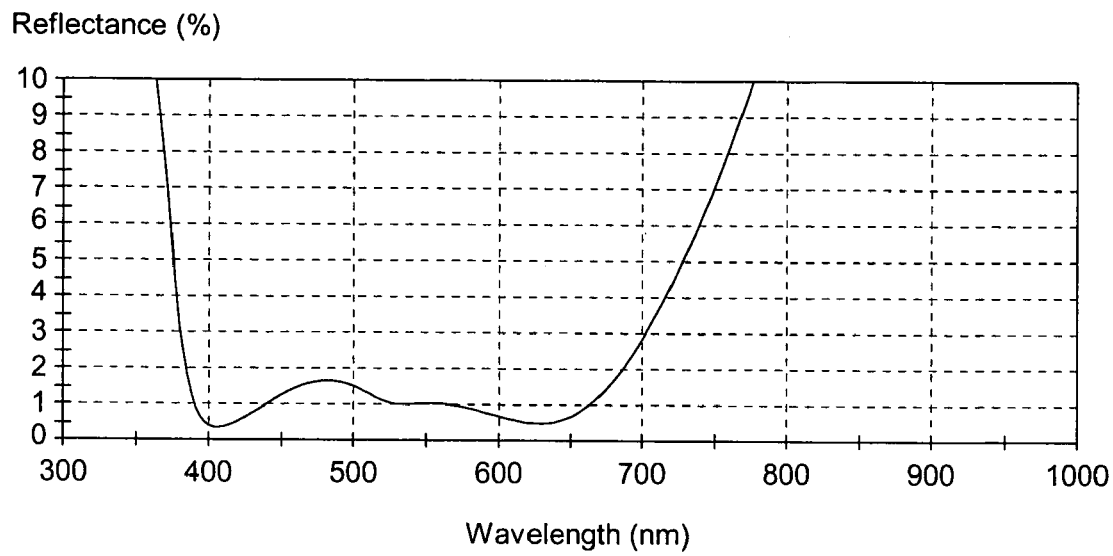
FIG. 7(a) is a diagram showing a spectral reflection curve in an objective lens in Example 2-1.
FIG. 7(b) is a diagram showing relationship between an angle of incidence for the objective lens and reflectance for P polarized light and S polarized light.
Figure 7:
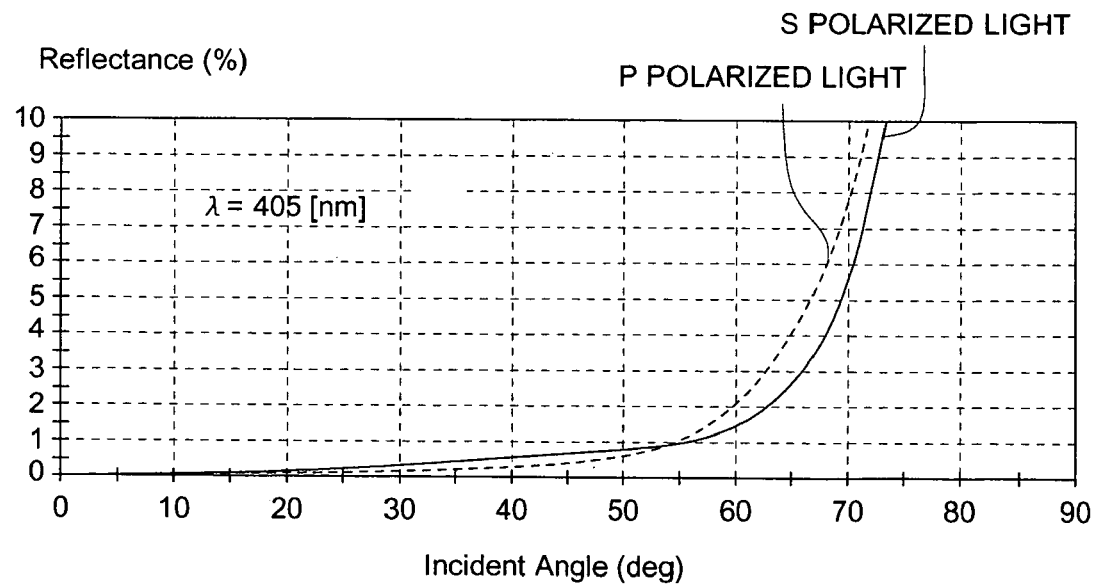

After the measurement, the reflectance on the optical functional surfaces 52A and 53A was 1% or less in the vicinity of wavelengths $\lambda 1$ and $\lambda 2$, as shown in FIG. 7(*a*).

This indicates that the objective lens 5A of the present Example 2-1 has antireflective functions for the first and second laser beams.

Further, reflectance for P polarized light and that for S polarized light in the first laser beam agreed substantially with each other independently of an angle of incidence and an angle of emergence, as shown in FIG. 7(*b*). It is therefore understood that the objective lens 5A controls disturbance of the state of polarization for the first laser beam.

The foregoing shows that a decline of an amount of transmitted light is prevented and disturbance of the state of polarization is controlled in the objective lens 5A, thereby, reliability of recording and reproducing can be enhanced.

Example 2-2

In Example 2-2, the objective lens 5A in the Second Embodiment was constructed as shown in Table 4.

TABLE 4

| Layer | Material | Index | Thickness |
|---|---|---|---|
| Air |  | 1 |  |
| 9 | MgF$_2$ | 1.39 | 105.09 |
| 8 | TiO$_2$ | 2.50 | 27.2 |
| 7 | Al$_2$O$_3$ | 1.65 | 19.25 |
| 6 | TiO$_2$ | 2.50 | 58.76 |
| 5 | Al$_2$O$_3$ | 1.65 | 36.11 |
| 4 | TiO$_2$ | 2.50 | 14.12 |
| 3 | Al$_2$O$_3$ | 1.65 | 23.52 |
| 2 | MgF$_2$ | 1.39 | 20.1 |
| 1 | Al$_2$O$_3$ | 1.65 | 64.93 |
| Lens | BK7 | 1.53 |  |

Spectral reflection characteristics on optical functional surfaces 52A and 53A of the objective lens 5A were measured. Further, there was measured the relationship between an angle of incidence for each of the first and second laser beams on the optical functional surfaces 52A and 53A and reflectance of P polarized light and S polarized light.

Figure 8:
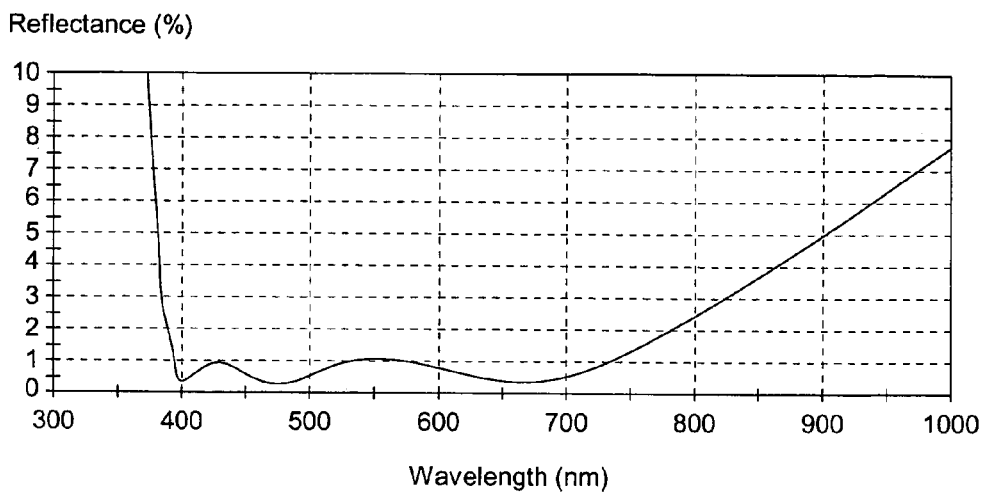
FIG. 8(a) is a diagram showing a spectral reflection curve in an objective lens in Example 2-2, and each of FIGS. 8(b) and 8(c) is a diagram showing relationship between an angle of incidence for the objective lens and reflectance for P polarized light and S polarized light.
Figure 8:
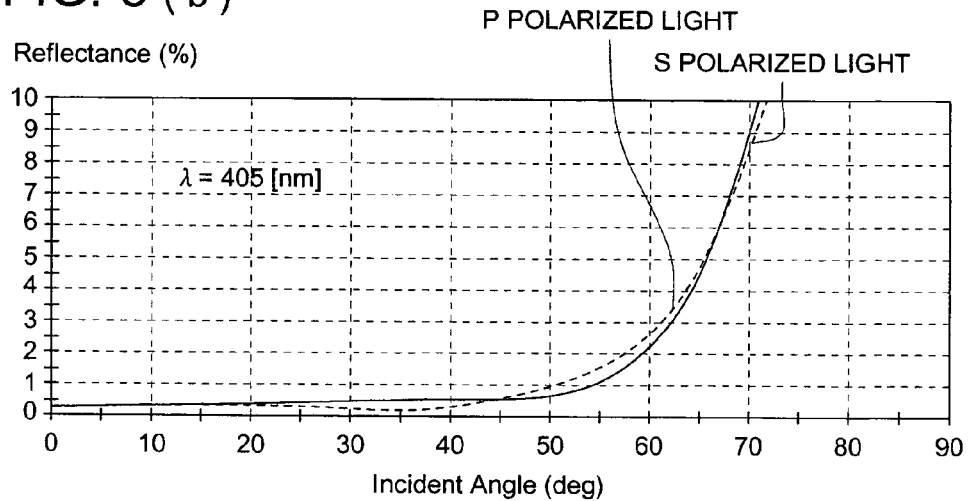
Figure 8:
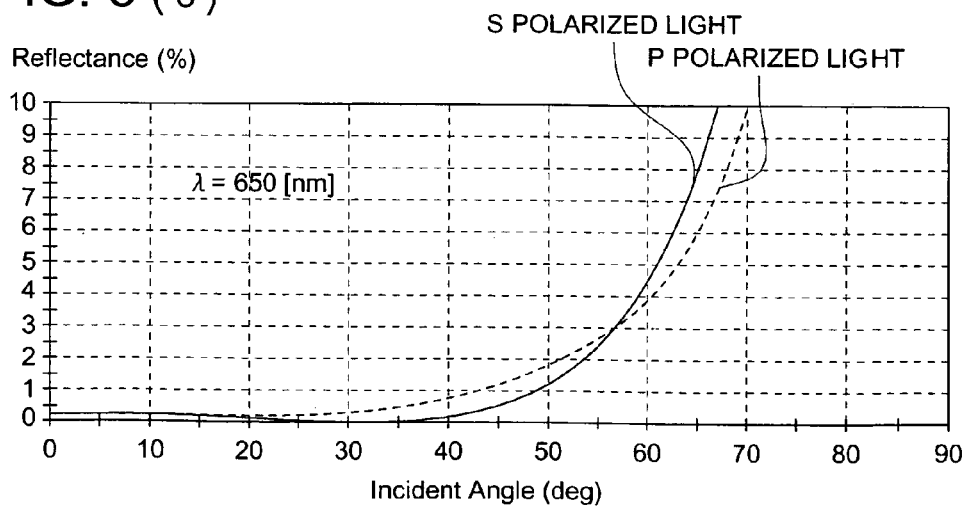

After the measurement, the reflectance on the optical functional surfaces 52A and 53A showed the minimum value to be 1% or less in a broad wavelength area including the neighborhood of wavelengths $\lambda 1$ and $\lambda 2$, as shown in FIG. 8(*a*). The wavelength that makes the reflectance to be minimum was one, that is longer than the wavelengths $\lambda 1$ and $\lambda 2$. Therefore, it is understood that the objective lens 5A in Example 2-2 has antireflective functions for the first and the second laser beams, and in particular, a decline of antireflective functions is prevented even on the area where angles of incidence and emergence of a laser beam are large, namely, on the outer circumferential portion of the objective lens 5A. Accordingly, it is preferable that antireflective film 51A of the objective lens 5A is applied to an optical element having an area where an angle of incidence and an angle of emergence of a laser beam are large.

Further, reflectance for P polarized light and that for S polarized light in the first and second laser beams agreed substantially with each other independently of an angle of incidence and an angle of emergence, as shown in FIGS. 8(*b*) and 8(*c*). It is therefore understood that the objective lens 5A controls disturbance of the state of polarization for the first and second laser beams.

The foregoing shows that a decline of an amount of transmitted light is prevented and disturbance of the state of polarization is controlled in the objective lens 5A, thereby, reliability of recording and reproducing can be enhanced.

Example 3-1

In Example 3-1, the objective lens 5B in the Third Embodiment was constructed as shown in Table 5.

TABLE 5

| Layer | Material | Index | Thickness |
|---|---|---|---|
| Air |  | 1 |  |
| 8 | TiO$_2$ | 2.50 | 4.56 |
| 7 | MgF$_2$ | 1.39 | 90.74 |
| 6 | TiO$_2$ | 2.50 | 25.39 |
| 5 | MgF$_2$ | 1.39 | 39.74 |
| 4 | TiO$_2$ | 2.50 | 30.55 |
| 3 | MgF$_2$ | 1.39 | 49.82 |
| 2 | TiO$_2$ | 2.50 | 9.24 |
| 1 | MgF$_2$ | 1.39 | 119.7 |
| Lens | BK7 | 1.53 |  |

Spectral reflection characteristics on optical functional surfaces 52B and 53B of the objective lens 5B were measured. Further, there was measured the relationship between an angle of incidence for each of the first and second laser beams on the optical functional surfaces 52B and 53B and reflectance of P polarized light and S polarized light.

Figure 9:
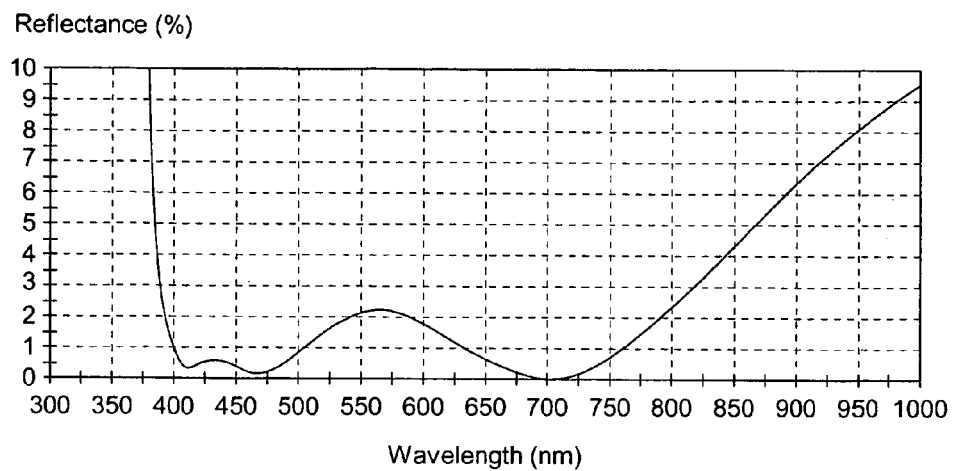
FIG. 9(a) is a diagram showing a spectral reflection curve in an objective lens in Example 3-1, and each of FIGS. 9(b) and 9(c) is a diagram showing relationship between an angle of incidence for the objective lens and reflectance for P polarized light and S polarized light.
Figure 9:
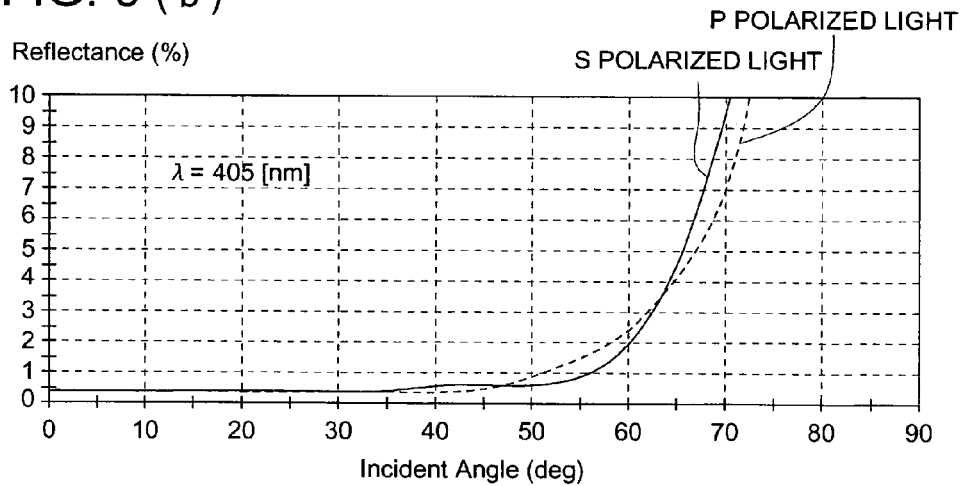
Figure 9:
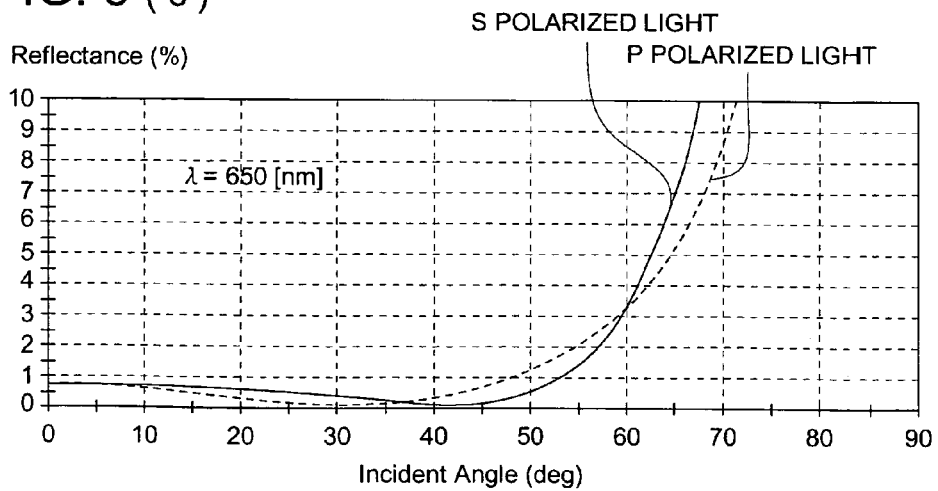

After the measurement, the reflectance on the optical functional surfaces 52B and 53B showed 1% or less in the vicinity of wavelength λ1, λ2 and λ3, as shown in FIG. 9(a), and the wavelength that makes the reflectance to be minimum was one that is longer than the wavelengths λ1 and λ2. Therefore, it is understood that the objective lens 5 in Example 3-1 has antireflective functions for the first-third laser beams, and it prevents a decline of an amount of transmitted light. Further, it is understood that the objective lens 5B prevents a decline of an amount of transmitted light on the area where angles of incidence and emergence of a laser beam are large, namely, on the outer circumferential portion of the objective lens 5B.

Further, reflectance for P polarized light and that for S polarized light in the first and second laser beams agreed substantially with each other independently of an angle of incidence and an angle of emergence, as shown in FIGS. 9(b) and 9(c). It is therefore understood that the objective lens 5B controls disturbance of the state of polarization for the first and second laser beams.

The foregoing shows that a decline of an amount of transmitted light is prevented and disturbance of the state of polarization is controlled by the objective lens 5B, thereby, reliability of recording and reproducing can be enhanced.

Example 3-2

In Example 3-2, the objective lens 5B in the Third Embodiment was constructed as shown in Table 6.

TABLE 6

| Layer | Material | Index | Thickness |
|-------|----------|-------|-----------|
| Air   |          | 1     |           |
| 17    | MgF$_2$  | 1.38  | 105.17    |
| 16    | TiO$_2$  | 2.32  | 21.26     |
| 15    | MgF$_2$  | 1.38  | 19.68     |
| 14    | TiO$_2$  | 2.32  | 73.8      |
| 13    | MgF$_2$  | 1.38  | 9.46      |
| 12    | TiO$_2$  | 2.32  | 28.28     |
| 11    | MgF$_2$  | 1.38  | 34.96     |
| 10    | TiO$_2$  | 2.32  | 10.14     |
| 9     | MgF$_2$  | 1.38  | 13.65     |
| 8     | TiO$_2$  | 2.32  | 6.44      |
| 7     | MgF$_2$  | 1.38  | 54.28     |
| 6     | TiO$_2$  | 2.32  | 3.95      |
| 5     | MgF$_2$  | 1.38  | 12.98     |
| 4     | TiO$_2$  | 2.32  | 2.34      |
| 3     | MgF$_2$  | 1.38  | 54.48     |
| 2     | TiO$_2$  | 2.32  | 2.86      |
| 1     | MgF$_2$  | 1.38  | 29.04     |
| Lens  | BK7      | 1.52  |           |

Spectral reflection characteristics on optical functional surfaces 52B and 53B of the objective lens 5B were measured. Further, there was measured the relationship between an angle of incidence for each of the first-third laser beams on the optical functional surfaces 52B and 53B and reflectance of P polarized light and S polarized light.

Figure 10:
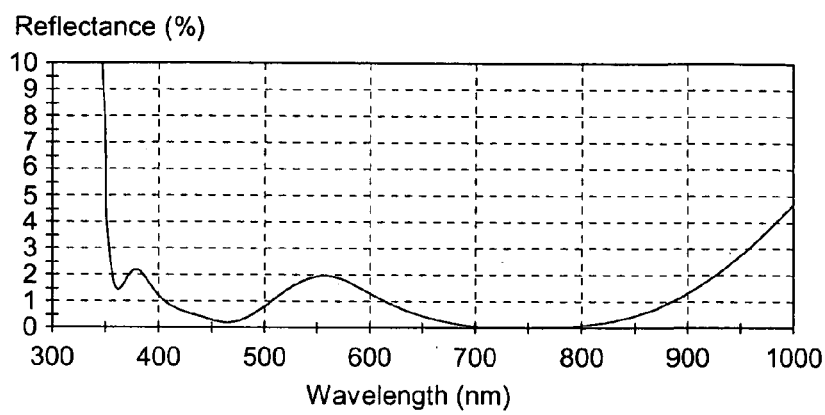
FIG. 10(a) is a diagram showing a spectral reflection curve in an objective lens in Example 3-2, and each of FIGS. 10(b), 10(c) and 10(d) is a diagram showing relationship between an angle of incidence for the objective lens and reflectance for P polarized light and S polarized light.
Figure 10:
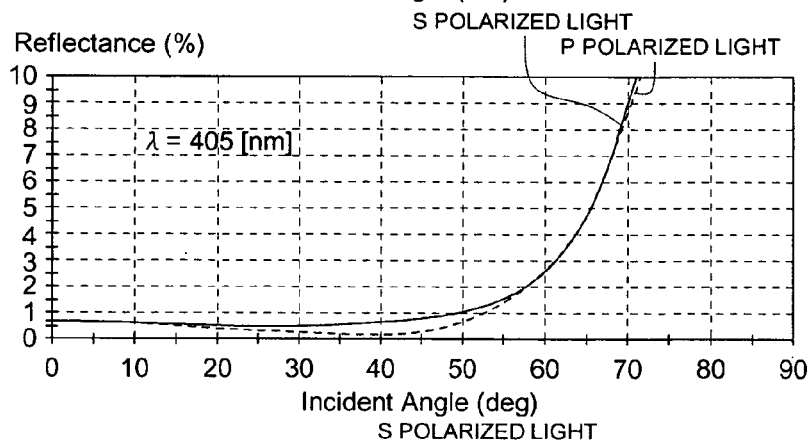
Figure 10:
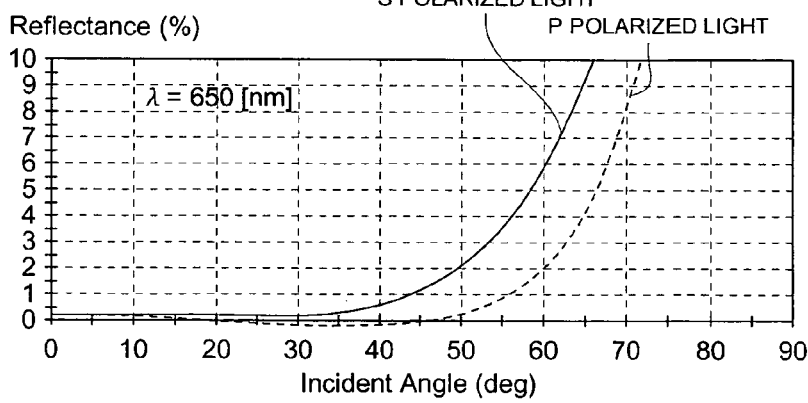
Figure 10:
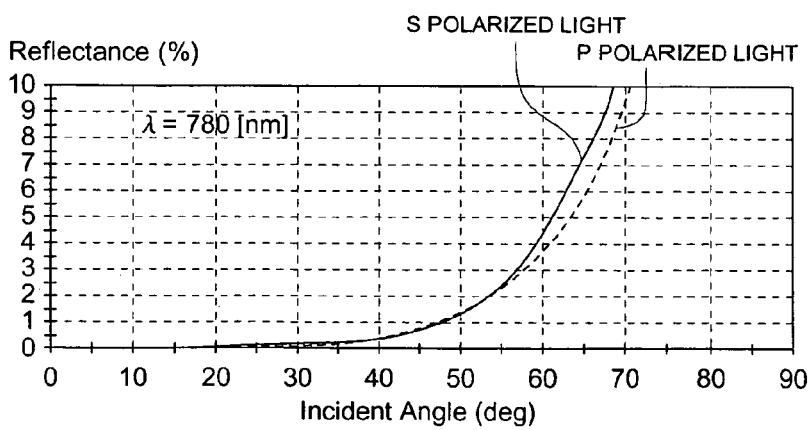

After the measurement, the reflectance on the optical functional surfaces 52B and 53B showed 1% or less in the vicinity of wavelengths λ1, λ2 and λ3, as shown in FIG. 10(a), an the wavelength that makes the reflectance to be minimum was one that is longer than the wavelengths λ1 and λ2. Therefore, it is understood that the objective lens 5 in Example 3-2 has antireflective functions for the first-third laser beams, and it prevents a decline of an amount of transmitted light. Further, it is understood that the objective lens 5B prevents a decline of an amount of transmitted light on the area where angles of incidence and emergence of a laser beam are large, namely, on the outer circumferential portion of the objective lens 5B.

Further, reflectance for P polarized light and that for S polarized light in the first-third laser beams agreed substantially with each other independently of an angle of incidence and an angle of emergence, as shown in FIGS. 10(b), 10(c) and 10(d). It is therefore understood that the objective lens 5B controls disturbance of the state of polarization for the first-third laser beams.

The foregoing shows that a decline of an amount of transmitted light is prevented and disturbance of the state of polarization is controlled by the objective lens 5B, thereby, reliability of recording and reproducing can be enhanced.

Example 4-1

In Example 4-1, the objective lens 5C in the Fourth Embodiment was constructed as shown in Table 7.

TABLE 7

| Layer | Material   | Index | Thickness |
|-------|------------|-------|-----------|
| Air   |            | 1     |           |
| 10    | MgF$_2$    | 1.39  | 106.21    |
| 9     | TiO$_2$    | 2.50  | 18.98     |
| 8     | Al$_2$O$_3$| 1.65  | 25.44     |
| 7     | TiO$_2$    | 2.50  | 92.11     |
| 6     | Al$_2$O$_3$| 1.65  | 30.61     |
| 5     | TiO$_2$    | 2.50  | 19.32     |
| 4     | Al$_2$O$_3$| 1.65  | 77.25     |
| 3     | TiO$_2$    | 2.50  | 10.43     |
| 2     | MgF$_2$    | 1.39  | 43.24     |
| 1     | Al$_2$O$_3$| 1.65  | 71.06     |
| Lens  | BK7        | 1.53  |           |

Spectral reflection characteristics on optical functional 52C and 53C of the objective lens 5C were measured. Further, there was measured the relationship between an angle of incidence for each of the first and second laser beams on the optical functional surfaces 52C and 53C and reflectance of P polarized light and S polarized light.

Figure 11:
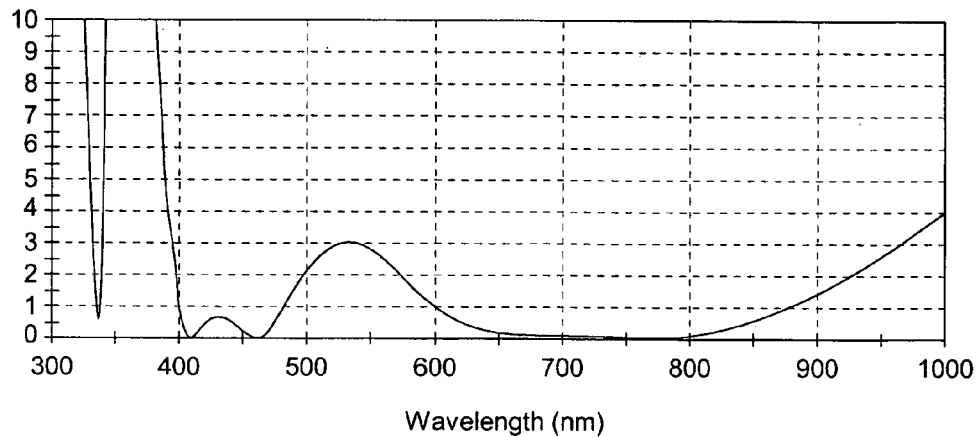
FIG. 11(a) is a diagram showing a spectral reflection curve in an objective lens in Example 4-1, and each of FIGS. 11(b) and 11(c) is a diagram showing relationship between an angle of incidence for the objective lens and reflectance for P polarized light and S polarized light.
Figure 11:
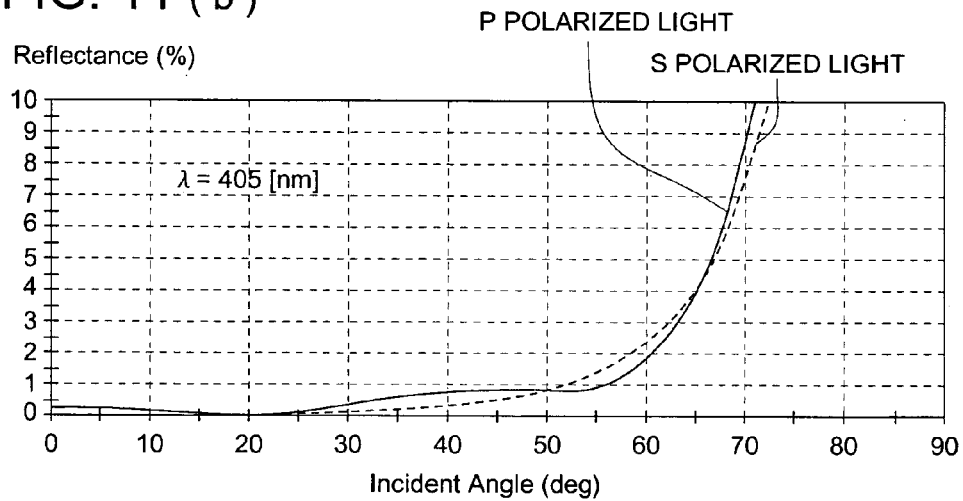
Figure 11:
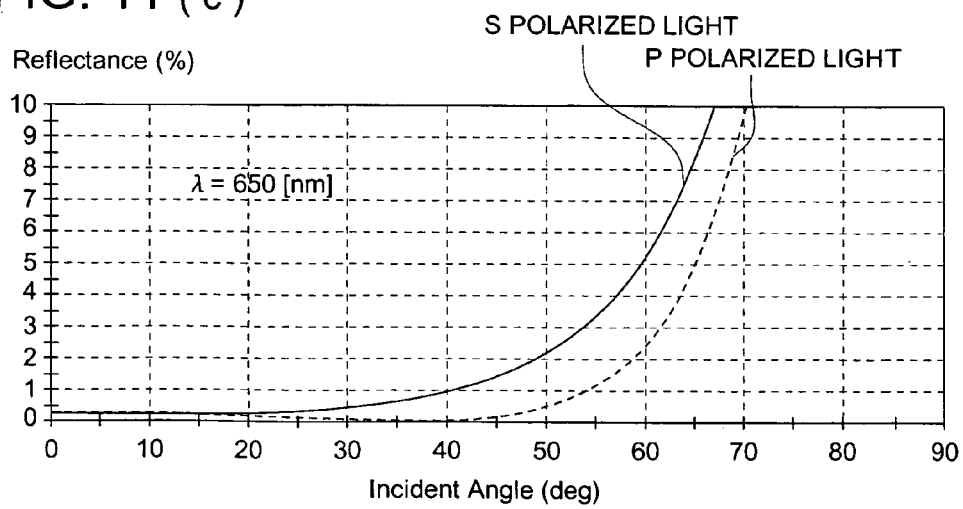

After the measurement, the reflectance on the optical functional surfaces 52C and 53C showed 1% or less in the vicinity of wavelengths λ1, λ2 and λ3, as shown in FIG. 11(a), and the wavelength that makes the reflectance to be minimum was one that is near wavelength λ1 and is longer than that with respect to wavelength λ1 and is longer than wavelength λ2 with respect to wavelength λ2. Therefore, it is understood that the objective lens 5C in Example 4-1 has antireflective functions for the first-third laser beams, and it prevents a decline of an amount of transmitted light. Further, it is understood that the objective lens 5C prevents a decline of an amount of transmitted light on the area where angles of incidence and emergence of a laser beam are large, namely, on the outer circumferential portion of the objective lens 5C.

Further, reflectance for P polarized light and that for S polarized light in the first and second laser beams agreed substantially with each other independently of an angle of incidence and an angle of emergence, as shown in FIGS. 11(b) and 11(c). It is therefore understood that the objective lens 5C controls disturbance of the state of polarization for the first and second laser beams.

The foregoing shows that a decline of an amount of transmitted light is prevented and disturbance of the state of polarization is controlled by the objective lens 5C, thereby, reliability of recording and reproducing can be enhanced.

Example 4-2

Example 4-2; the objective lens 5C in the Fourth Embodiment was constructed as shown in Table 8.

TABLE 8

| Layer | Material | Index | Thickness |
|---|---|---|---|
| Air |  | 1 |  |
| 21 | $MgF_2$ | 1.39 | 113.17 |
| 20 | $TiO_2$ | 2.50 | 19.54 |
| 19 | $Al_2O_3$ | 1.65 | 34.25 |
| 18 | $TiO_2$ | 2.50 | 171.77 |
| 17 | $Al_2O_3$ | 1.65 | 10.35 |
| 16 | $TiO_2$ | 2.50 | 23.27 |
| 15 | $Al_2O_3$ | 1.65 | 90.27 |
| 14 | $MgF_2$ | 1.39 | 113.78 |
| 13 | $Al_2O_3$ | 1.65 | 32.8 |
| 12 | $MgF_2$ | 1.39 | 57.33 |
| 11 | $TiO_2$ | 2.50 | 7.85 |
| 10 | $Al_2O_3$ | 1.65 | 109.8 |
| 9 | $MgF_2$ | 1.39 | 250.97 |
| 8 | $Al_2O_3$ | 1.65 | 95.72 |
| 7 | $TiO_2$ | 2.50 | 10.22 |
| 6 | $MgF_2$ | 1.39 | 20.31 |
| 5 | $Al_2O_3$ | 1.65 | 140.28 |
| 4 | $MgF_2$ | 1.39 | 34.29 |
| 3 | $TiO_2$ | 2.50 | 9.63 |
| 2 | $MgF_2$ | 1.39 | 45.28 |
| 1 | $Al_2O_3$ | 1.65 | 53.65 |
| Lens | BK7 | 1.53 |  |

Spectral reflection characteristics on optical functional surfaces 52C and 53C of the objective lens 5B were measured. Further, there was measured the relationship between an angle of incidence for each of the first-third laser beams on the optical functional surfaces 52C and 53C and reflectance of P polarized light and S polarized light.

Figure 12:
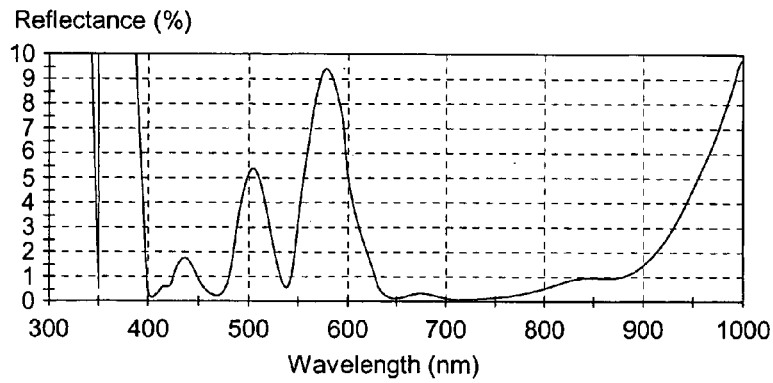
FIG. 12(a) is a diagram showing a spectral reflection curve in an objective lens in Example 4-2, and each of FIGS. 12(b), 12(c) and 12(d) is a diagram showing relationship between an angle of incidence for the objective lens and reflectance for P polarized light and S polarized light.
Figure 12:
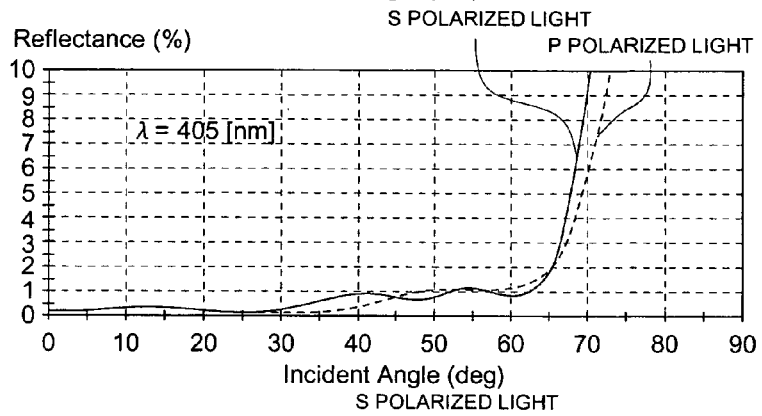
Figure 12:
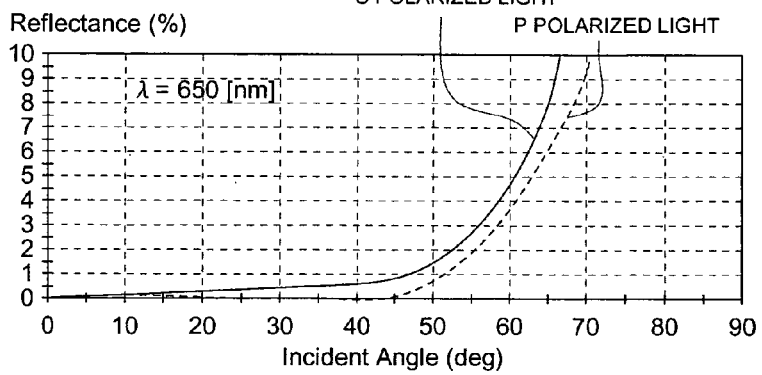
Figure 12:
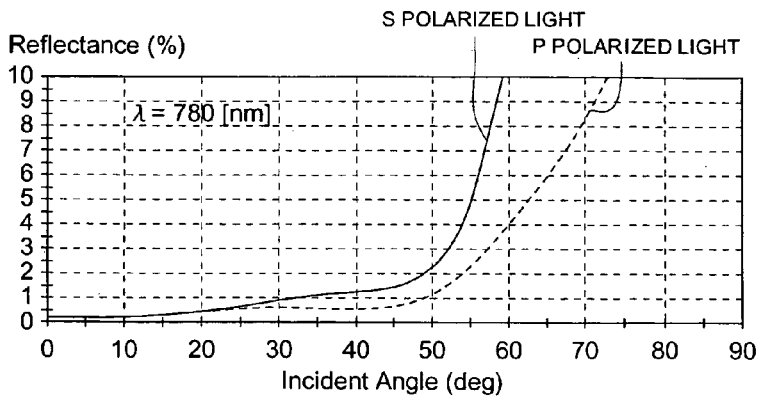
Figure 13:
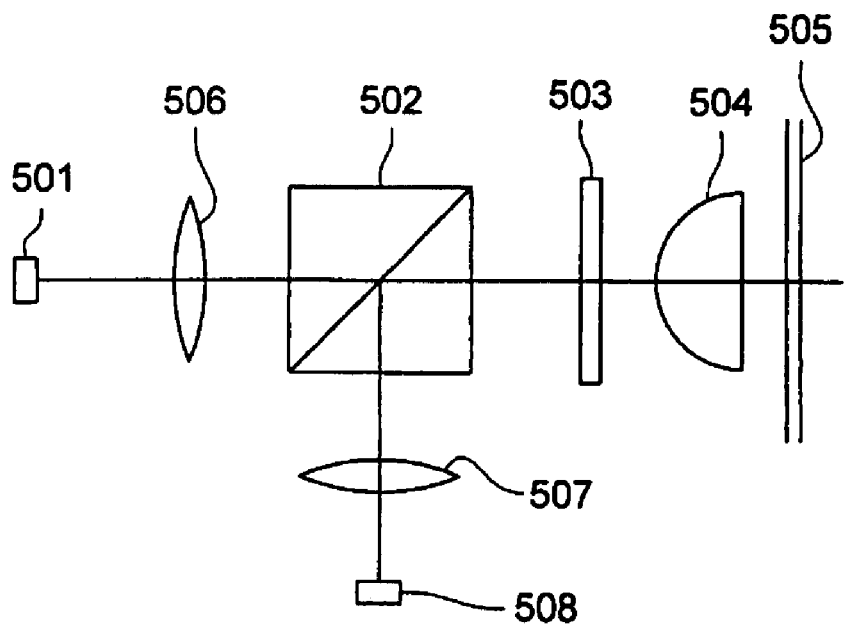
FIG. 13 is a diagram showing a schematic structure of a conventional optical pickup device.
Figure 14:
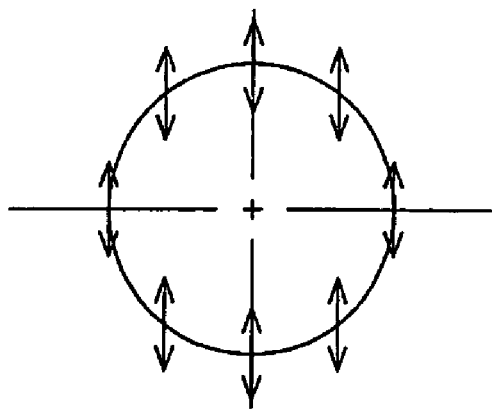
FIG. 14(a) is a state of polarization before light passes through an objective lens in a conventional optical pickup device.
FIG. 14(b) is a state of polarization after light passes through an objective lens in a conventional optical pickup device.
Figure 14:
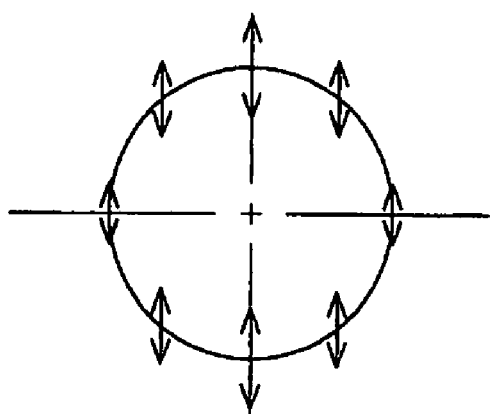

After the measurement, the reflectance on the optical functional surfaces 52C and 53C showed 1% or less in the vicinity of wavelengths $\lambda 1$, $\lambda 2$ and $\lambda 3$, as shown in FIG. 12(a), and the wavelength that makes the reflectance to be minimum was one that is near wavelength $\lambda 1$ and is longer than that with respect to wavelength $\lambda 1$ and is longer than wavelength $\lambda 2$ with respect to wavelength $\lambda 2$. Therefore, it is understood that the objective lens 5C in Example 4-2 has antireflective functions for the first-third laser beams, and it prevents a decline of an amount of transmitted light. Further, it is understood that the objective lens 5C prevents a decline of an amount of transmitted light on the area where angles of incidence and emergence of a laser beam are large, namely, on the outer circumferential portion of the objective lens 5C.

Further, reflectance for P polarized light and that for S polarized light in the first-third laser beams agreed substantially with each other independently of an angle of incidence and an angle of emergence, as shown in FIGS. 12(b), 12(c) and 12(d). It is therefore understood that the objective lens 5C controls disturbance of the state of polarization for the first-third laser beams.

The foregoing shows that a decline of an amount of transmitted light is prevented and disturbance of the state of polarization is controlled by the objective lens 5C, thereby, reliability of recording and reproducing can be enhanced.

Since the structure described in Item 1 or Item 2 prevents that an amount of light entering the photodetector is reduced and distortions are generated on signals by dissociation between transmittance for P polarized light and that for S polarized light on an outer peripheral portion of the optical element, which is different from conditions in the past, it is possible to conduct accurate recording and/or reproducing of information by using the first laser beam.

Since the structure described in Item 3 or Item 4 makes it possible naturally to obtain the same effect as that of the structure described in Item 1 or Item 2, and prevents that an amount of light entering the photodetector is reduced and distortions are generated on signals, which is different from conditions in the past, it is possible to conduct accurate recording and/or reproducing of information by using the second laser beam.

Since the structure described in Item 5 or Item 6 makes it possible naturally to obtain the same effect as that of the structure described in Item 1-Item 4, and prevents that an amount of light entering the photodetector is reduced and distortions are generated on signals, which is different from conditions in the past, it is possible to conduct accurate recording and/or reproducing of information by using the third laser beam.

Since the structure described in Item 7 or Item 8 makes it possible naturally to obtain the same effect as that of the structure described in either one of Item 1-Item 6, and prevents that an amount of light entering the photodetector is reduced and distortions are generated on signals, which is different from conditions in the past, it is possible to conduct accurate recording and/or reproducing of information by using the second or the third laser beam.

In the structure described in Item 9, it is naturally possible to obtain the same effect as that of the structure described in either one of Item 1-Item 8, and it is possible to conduct accurate recording and/or reproducing of information, in an optical pickup device that can operate for all of a blue ray disc or AOD, DVD and CD.

In the structure described in Item 10, it is naturally possible to obtain the same effect as that of the structure described in either one of Item 1-Item 9, and it is possible to enhance more surely the transmittance for P polarized light and S polarized light on an outer circumferential portion of an optical element.

In the structure described in Item 11, it is possible to obtain the same effect as that of the structure described in either one of Item 1-Item 10.

In the structure described in Item 12, it is possible to obtain the same effect as that of the structure described in Item 11.

In the structure described in Item 13, it is possible to obtain the same effect as that of the structure described in either one of Item 1-Item 10.

In the structure described in Item 14, it is possible to obtain the same effect as that of the structure described in Item 13.

In the structure described in Item 15, it is naturally possible to obtain the same effect as that of the structure described in either one of Item 1-Item 14, and it is possible to conduct recording and/or reproducing, with a blue ray disc or AOD serving an information recording medium.

In the structure described in Item 16, it is possible to obtain the same effect as that of the structure described in either one of Item 1-Item 15.

In the structure described in Item 17, it is possible to obtain the same effect as that of the structure described in either one of Item 1-Item 15.

In the structure described in Item 18, it is naturally possible to obtain the same effect as that of the structure described in either one of Item 1-Item 17, and it is possible to improve sticking properties of the antireflective film for the optical element main body.

In the structure described in Item 19, it is possible to obtain the same effect as that of the structure described in either one of Item 1-Item 18.

In the structure described in Item 20, it is possible to obtain the same effect as that of the structure described in Item 19.

What is claimed is:

1. An optical pickup apparatus for conducting information recording and/or reproducing and to converge laser light beams having a plurality of wavelengths including a wavelength of λ1 (390 nm≦λ1≦430 nm) and a wavelength λ2 (630 nm≦λ2≦670 nm) onto information recording media, comprising:

one or more of optical element main bodies; and an antireflective film which is arranged on at least one surface on the optical element main bodies and on which an optical functional surface is formed, wherein, when the optical functional surface and a first laser beam having the wavelength λ1 make an angle θ₁ in the range of 0°≦θ₁≦60°, the optical element satisfies $|R_{p1}-R_{s1}|\leq 2\%$ over the entire range of 0°≦θ₁≦60°, where $R_{p1}$ and $R_{s1}$ are respectively P polarized light and S polarized light reflectivities of the first laser beam on the optical functional surface, and wherein, when the optical functional surface and a second laser beam having the wavelength λ₂ make an angle θ₂ in the range of 0°≦θ₂≦50°, the optical element satisfies $|R_{p2}-R_{s2}|\leq 4\%$ over the entire range of 0°≦θ₂≦50°, where $R_{p2}$ and $R_{s2}$ are respectively P polarized light and S polarized light reflectivities of the second laser beam on the optical functional surface.

2. The optical element of claim 1,
   wherein, when the optical functional surface and the first laser beam having the wavelength λ1 make an angle θ₁ in the range of 0°≦θ₁≦60°, the optical element satisfies $(R_{p1}+R_{s1})/2\leq 5\%$ over the entire range of 0°≦θ₁≦60°.

3. The optical element of claim 1 wherein, when the optical functional surface and the second laser beam having the wavelength λ2 make an angle θ₂ in the range of 0°≦θ₂≦50°, the optical element satisfies $(R_{p2}+R_{s2})/2\leq 5\%$ over the entire range of 0°≦θ₂50°.

4. The optical element of claim 1, wherein the plurality of wavelengths comprises a wavelength λ3 (760 nm≦λ3800 nm) and when the optical functional surface and a third laser beam having the wavelength λ3 make an angle θ₃ in the range of 0°≦θ₃≦50°, the optical element satisfies $|R_{p3}-R_{s3}|\leq 4\%$ over the entire range of 0°≦θ₃≦50°, where $R_{p3}$ and $R_{s3}$ are respectively P polarized light and S polarized light reflectivities of the third laser beam on the optical functional surface.

5. The optical element of claim 4, wherein when the optical functional surface and the third laser beam having the wavelength λ3 make an angle θ₃ in the range of 0°≦θ₃≦50°, the optical element satisfies $(R_{p3}+R_{s3})/2\leq 5\%$ over the entire range of 0°≦θ₃≦50°.

6. The optical element of claim 1,
   wherein the plurality of wavelengths comprises a wavelength λ3 (760 nm≦λ3 ≦800 nm), when the optical functional surface and a second laser beam having the wavelength λ3 make an angle θ₃ in the range of 0°≦θ₃≦50°, optical element satisfies $|R_{p3}-R_{s3}|\leq 2\%$ over the entire range of 0°≦θ₃≦50°, where $R_{p3}$ and $R_{s3}$ are respectively P polarized light and S polarized light reflectivities of the third laser beam on the optical functional surface.

7. The optical element of claim 6,
   wherein when the optical functional surface and the second laser beam having the wavelength λ2 make an angle θ2 in the range of 0°≦θ₂≦50°, the optical element satisfies $(R_{p2}+R_{s2})/2\leq 5\%$ over the entire range of 0°≦θ₂50°, and when the optical functional surface and the third laser beam having the wavelength λ3 make an angle θ3 in the range of 0°≦θ₃≦50°, the optical element satisfies $(R_{p3}+R_{s3})/2\leq 5\%$ over the entire range of 0≦θ₃≦50°.

8. The optical element of claim 1,
   wherein the plurality of wavelengths comprises a wavelength λ3 (760 nm ≦λ3≦800 nm).

9. The optical element of claim 1, wherein the antireflective films are arranged on both surfaces of each optical element main bodies.

10. The optical element of claim 1,
    wherein the antireflective film is formed by at least two types of materials including
    a material having a lower refractive index of 1.3≦n≦1.55 and a material having a higher refractive index of 1.7≦n≦2.5,
    where n is a refractive index for a light flux having a wavelength of 500 nm.

11. The optical element of claim 10, wherein the material having the lower refractive index is based on $MgF_2$ or $SiO_2$ and the material having the higher refractive index is based on $TiO_2$, $Ta_2O_5$, $CeO_2$, $ZrO_2$, $HfO_2$ or $CeF_3$.

12. The optical element of claim 1, wherein the antireflective film is formed by at least three types of materials including
    a material having a lower refractive index of 1.3≦n≦1.55,
    a material having a middle refractive index of 1.55≦n≦1.7 and a material having a higher refractive index of 1.7≦n≦2.5,
    where n is a refractive index for a light flux having a wavelength of 500 nm.

13. The optical element of claim 12,
    wherein the material having the lower refractive index is based on $MgF_2$ or $SiO_2$, the material having the middle refractive index is based on $Al_2O_3$ and the material having the higher refractive index is based on $TiO_2$, $Ta_2O_5$, $CeO_2$ $ZrO_2$, $HfO_2$ or $CeF_3$.

14. The optical element of claim 1,
    wherein the optical element is an objective lens having a numerical aperture of 0.65 or more.

15. The optical element of claim 1 wherein the optical element main body is made by plastic molding.

16. The optical element of claim 1 wherein the optical element main body is made by glass molding.

17. The optical element of claim 1,
    wherein a primary coat lies between the optical element main bodies and the antireflective film
    and satisfies $|n_0'-n_0|\leq 0.1$ where $n_0'$ is a refractive index of the primary coat and $n_0$ is a refractive index of the optical element main bodies.

18. An optical pickup apparatus comprising a laser light source and a converging system having the optical element of claim 1,
    which converges laser beams emitted by the laser light sources onto the optical recording media to conduct at least one of information recording or information reproducing on the optical recording media.

19. The optical pickup apparatus of claim 18, wherein at least one of the laser light beams having the plurality of wavelengths entering into the optical element bodies has a linear polarization.

* * * * *